(12) United States Patent
Beyschlag et al.

(10) Patent No.: US 6,831,915 B1
(45) Date of Patent: Dec. 14, 2004

(54) SERVICE NODE FOR PROVIDING TELECOMMUNICATION SERVICES

(75) Inventors: Ulf Beyschlag, Claix (FR); Nicolas Raguideau, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/367,804

(22) PCT Filed: Feb. 19, 1998

(86) PCT No.: PCT/EP98/01119

§ 371 (c)(1),
(2), (4) Date: Feb. 2, 2000

(87) PCT Pub. No.: WO98/37688

PCT Pub. Date: Aug. 27, 1998

(30) Foreign Application Priority Data

Feb. 20, 1997 (EP) .............................. 97410020

(51) Int. Cl.[7] .............................. H04L 12/66; H04J 3/12
(52) U.S. Cl. ...................... 370/352; 370/410; 370/522
(58) Field of Search ................................ 370/352, 353, 370/355, 356, 522, 410, 360, 363, 368, 371, 524; 717/168–178

(56) References Cited

U.S. PATENT DOCUMENTS

| 4,659,877 A | 4/1987 | Dorsey et al. |
| 5,265,033 A | 11/1993 | Vajk et al. |

(List continued on next page.)

FOREIGN PATENT DOCUMENTS

| EP | 0 654 930 A1 | 5/1993 |
| EP | 0 724 368 A2 | 7/1996 |
| WO | WO 93/25035 | 12/1993 |
| WO | WO 94/23523 | 10/1994 |
| WO | WO 96/09714 | 3/1996 |
| WO | WO 96/20553 | 7/1996 |
| WO | WO 96/38018 | 11/1996 |
| WO | WO 97/16007 | 5/1997 |
| WO | WO 97/20424 | 6/1997 |
| WO | WO 97/26749 | 7/1997 |
| WO | WO 97/32427 | 9/1997 |

OTHER PUBLICATIONS

Atkins, et al., "Integrated Web and Telephone Service Creation," *Bell Labs Technical Journal*, Winter, pp. 19–35 (1997).

Esaki, Shuji, et al., "Service Logic Execution of IN in Multi–Vendor Environment, " *NTT*, pp. 441–450 (May 1992).

(List continued on next page.)

*Primary Examiner*—Chau Nguyen
*Assistant Examiner*—Soon-Dong Hyun

(57) ABSTRACT

A telephone network is provided with a service node SN (50) having an interface to the Internet. The SN (50) has a voice service browser (51) which it can use to access resources on the Internet, these resources preferably being held on WWW servers (52). A user of the telephone network places his own service logic programs, in the form of applets 55, on his WWW home page (53) together with content items such announcements and messages; these content items may be embedded in the applets (55) or held in separate files. When the SN (50) receives a service request to supply a service to a user identified as having his own service logic programs and content items available on the WWW, the voice service browser (51) reaches out over the WWW to retrieve the relevant service applet (55) and any associated content items. The voice service browser (51) then executes the applet (55) to provide the desired service including the delivery of content items through a text-to-voice converter or the like.

32 Claims, 11 Drawing Sheets

U.S. PATENT DOCUMENTS

| | | | |
|---|---|---|---|
| 5,423,003 A | | 6/1995 | Berteau |
| 5,438,568 A | | 8/1995 | Weisser, Jr. |
| 5,452,350 A | | 9/1995 | Reynolds et al. |
| 5,519,772 A | * | 5/1996 | Akman et al. ......... 379/221.08 |
| 5,533,115 A | * | 7/1996 | Hollenbach et al. ... 379/221.11 |
| 5,546,452 A | | 8/1996 | Andrews et al. |
| 5,574,782 A | * | 11/1996 | Baird et al. ............ 379/221.09 |
| 5,703,940 A | * | 12/1997 | Sattar et al. ........... 379/201.05 |
| 5,708,780 A | | 1/1998 | Levergood et al. |
| 5,917,817 A | * | 6/1999 | Dunn et al. .................. 370/352 |
| 5,999,610 A | * | 12/1999 | Lin et al. ................ 379/207.02 |
| 6,324,275 B1 | * | 11/2001 | Yagel et al. ........... 379/201.03 |
| 6,466,570 B1 | * | 10/2002 | Low et al. .................. 370/352 |

OTHER PUBLICATIONS

Kabay, S., et al., "The Service Node—An Advanced IN Services Element," *BT Technology Journal* vol. 13 No. 2, pp. 64–72 (1995).

Low, Colin, et al., "WebIN—An Architecture for Fast Deployment of IN–based Personal Services," Proceedings of IN '96, Melbourne (April 1996).

Low, Colin, "The Internet Telephony Red Herring," HP Laboratories Technical Report (May 15, 1996).

* cited by examiner

SERVICE NODE FOR PROVIDING TELECOMMUNICATION SERVICES

FIELD OF THE INVENTION

The present invention relates to a service node for providing services in a switched telecommunications system.

As used herein, the term "switched telecommunication system" means a system comprising a bearer network with switches for setting up a bearer channel through the network. The term "switched telecommunication system" is to be taken to include not only the existing public and private telephone systems (whether using analogue phones or ISDN-based), but also broadband (ATM) and other switch-based bearer networks that are currently being implemented or may emerge in the future. For convenience, the term "switched telecommunication system" is sometimes shortened herein to telecommunication system.

Reference to a "call" in the context of a switched telecommunication system is to be understood as meaning a communication through a bearer channel set up across the bearer network, whilst references to call setup, maintenance and takedown are to be taken to mean the processes of setting up, maintaining and taking down a bearer channel through the bearer network. Terms such as "call processing" and "call handling" are to be similarly interpreted.

The term "communication system" when used herein should be understood as having a broader meaning than switched telecommunication system, and is intended to include datagram-based communication systems where each data packet is independently routed through a bearer network without following a predetermined bearer channel.

BACKGROUND OF THE INVENTION

Telecommunication companies running PSTNs (Public Switched Telephone Networks) and PLMNs (Public Land Mobile Networks) are in the business of providing communication services and in doing so are providing increasing built-in intelligence in the form of "IN services" such as 800 number services and call forwarding. In contrast, the World Wide Web (WWW), which has seen explosive growth in recent times, is an example of an Internet-based global network providing complex information services. These two worlds, that of the large communications utilities and that of the highly dynamic, pioneer-spirit WWW information culture, are uneasy companions and each plans to encroach on the domain previously occupied by the others; thus telephony services will be offered over the WWW and information services over the public communication infrastructure.

The present invention proposes technologies for a more synergetic relationship between these two worlds than is currently envisaged and in order to place the present invention in context, a review will first be given of each of these two worlds.

Telephone Networks with IN Services

The Basic PSTN.

The basic service provided by a PSTN (Public Switched Telephone Network) is the interconnection of two telephones (that is, setting up a bearer channel between the telephones) according to a called-party telephone number input at the calling-party telephone. FIG. 1 is a simplified representation of a PSTN providing such a service. In particular, customer premises equipment, CPE, 10 (such as standard analogue telephones, but also more recently ISDN terminals) are connected through an access network 11 to switching points, SPs 12. The SPs 12 form nodes in an inter-exchange network 13 made up of interconnecting trunks 14 and SPs that are controlled by control entities 15 in the SPs. The control effected by the control entities 15 is determined by signalling inputs received from the CPEs and other SPs, and involves call setup, maintenance and clearance to provide the desired bearer channel between calling CPE and called CPE. Conceptually, the PSTN may be thought of as a bearer network and a control (signalling) network, the function of the latter being to effect call control through the bearer network, namely the control of setup, maintenance and take down of bearer channels through the bearer network; in practice, the bearer and signalling networks may use the same physical circuits and even the same logical channels.

Thus, where the CPE is a traditional dumb telephone, control signalling between the CPE and its local SP is in-band signalling, that is, the signalling is carried on the same channel as used for voice; this signalling is interpreted and converted at the SPs 12 into signalling between SPs that uses a dedicated common-channel signalling network 16 (implemented nowadays using the SS7 protocol suite). Where the CPE is an ISDN terminal, signalling is carried in a separate channel directly from the CPE on an end-to-end. Modern SPs use the ISUP (ISDN User Part) SS7 protocol for inter-exchange call control signalling whether the CPE is a standard telephone or an ISDN terminal.

Intelligent Networks.

In addition to basic call handling, an SP may also serve to provide what are called IN (Intelligent Network) services; in this case the SP is termed a service switching point, SSP. An SSP 25 is arranged to suspend call processing at defined points-in-call upon particular criteria being met, and to delegate the continuation of call processing to a service control subsystem providing a service control function (SCF) either in the form of a service control point, SCP 17 (see FIG. 2) or an Adjunct 18. The Adjunct 18 is directly associated with an SSP 25 whilst the SCP 17 and SSP 25 communicate with each other via an extended common channel signalling (CCS) network 16 that may include signal transfer points (STP) 19. The SCP 17 may be associated with more than one SSP 25. Both the SCP 17 and Adjunct 18 provide a service logic execution environment (SLEE) 20 in which instances of one or more service logic programs (SLP) 21 can execute. The SLEE 20 and SLP 21 together provide service control functionality for providing services to the SSP 25.

Service logic running in an SCP or Adjunct will generally make use of subscriber information stored in a service data function (SDF) 22 that may be integral with the SCP/Adjunct or partially or wholly separate therefrom. The service data function (SDF), like the service control function (SCF) forms part of the service control subsystem of the PSTN. It may be noted that some or all of the service control function may be built into the PSTN switches themselves.

In operation, when the SSP 25 receives a call, it examines internal trigger conditions and, possibly, user information (eg dialled digits) to ascertain if the call requires a service to be provided by the service control subsystem 17, 18; the checking of trigger conditions may be carried out at several different points in call processing. Where the SSP 25 determines that a service is required it messages the service control subsystem (either SCP 17 or Adjunct 18) requesting the desired service and sending it a logic representation of the call in terms of its connectivity and call processing status. The service control subsystem then provides the requested service and this may involve either a single interaction between the SSP and service control subsystem or a session of interactions. A typical service is call forwarding which is a called-party service giving expression to an end-user requirement as simple as "if you call me on number X and it rings ten times, try calling number Y". In this case, it is the SSP local to the called end-user that triggers its associated SCP (or Adjunct) to provide this service; it will, of course, be appreciated that the SSP must be primed to know that the service is to be provided for a called number X.

In addition to the SCP 17 and Adjunct 18, the FIG. 2 network includes an intelligent peripheral (IP) 23 that has bearer-channel connectivity to one or more SSPs 25. The IP 23 provides resources needed to exchange information with an end user, such as voice announcements and DTMF digit collection capabilities (this type of non-signalling information intended to be passed over a bearer-channel to/from the end user is referred to below generally as "content"). These IP resources are managed and controlled by a resource control execution environment (RCEE) 26 of the IP 23 in response to input received from an SSP 25. Such input may result, for example, from the service control subsystem (SCP 17, Adjunct 18), during execution of an SLP 21, requiring a voice announcement to be played to an end user; in this case the service control subsystem passes this requirement to the SSP concerned which sets up a bearer channel to the IP 23 and commands the IP to play the required announcement. It is also possible to arrange for the service control subsystem to communicate directly over the CCS network with an IP rather than going through an SSP 25.

IP functionality and resources may also be provided within a service node (SN) 27 which like an IP has bearer-channel connectivity to an SSP; however, an SN additionally includes a service node execution environment (SNEE) 28, similar to SLEE 20, for running service logic programs. An SN can thus provide a range of services virtually autonomously once an SSP has switched through a call to the SN; in particular, an SN is apt to provide services such as voice mail, automated attendant and fax server, all of which require substantial transfer of content to/from an end user. The IP functionality and resources of an SN are generally not under the exclusive control of the SNEE of the SN but can be used by remote SLEEs. To the extent that an SN can execute specific types of SLPs, it forms part of the service control subsystem of the network.

The network will also include an operation system (not shown) that has a general view of the network and its services and performs functions such as network monitoring and control.

The above-described model for the provision of IN services in a PSTN can also be mapped onto PLMNs (Public Land Mobile Networks) such as GSM and other mobile networks. Control signalling in the case of a mobile subscriber is more complex because in addition to all the usual signalling requirements, there is also a need to establish where a call to a mobile subscriber should be routed; however, this is not a very different problem from a number of called-party IN services in the PSTN. Thus in GSM, the service data function (SDF) is largely located in a system named a Home Location Register (HLR) and the service control function in a system named a Visitor Location Register (VLR) that is generally associated on a one-to-one basis with each SSP (which in GSM terminology is called a Mobile Switching Centre, MSC).

Because subscribers are mobile, the subscriber profile is transported from the HLR to whichever VLR happens to be functionally closest to be mobile subscriber, and from there the VLR operates the (fixed) service using the subscriber profile and interacts with the SSP. The HLR and VLR thus constitute a service control subsystem similar to an SCP or Adjunct with their associated databases.

It is, of course, also possible to provide IN services in private telephone systems and, in this case, the service control function and service data function are generally either integrated into a PABX (Private Automatic Branch Exchange) or provided by a local computer. The service control subsystem, whilst present, may thus not be a physically distinct from the PABX.

The above-described general architectural framework for providing IN services has both strengths and flaws. Its main strength is that it works and many services have been successfully deployed, such as 800 number services, credit card calling, voicemail, and various call waiting and redirection services. However, despite years of standardisation, services are still implemented one-at-a-time on proprietary platforms and do not scale well. The approach has been based on large, fault-tolerant systems which provide services for hundreds of thousands or even millions of subscribers and take years to deploy. Furthermore, since the networks used to support these services also constitute the basic telephone infrastructure, anything attached to these networks must be rigorously vetted. Additionally, each country and operator tends to have local variations of the so-called standards making it difficult to supply standard products and thereby braking the dynamics of competition.

The World Wide Web

In contrast to the slow deliberate progress of the telephone infrastructure, the WWW has grown explosively from its inception in 1989 to become the primary electronic information distribution service in terms of spread, availability and richness of information content. Anyone can, for a modest outlay, become an information provider with a world-wide audience in a highly interconnected information architecture.

The WWW is a client-server application running over the Internet and using a client-server protocol which mandates only the simplest of exchanges between client and server. This protocol is HTTP (Hyper Text Transfer Protocol) which is optimised for use over TCP/IP networks such as the Internet; the HTTP protocol can, however, also be used over networks using different communication protocol stacks.

Since the availability of literature concerning the WWW has seen the same sort of growth as the WWW itself, a detailed description of the WWW, HTTP and the Internet will not be given herein. An outline description will, however, be given with attention being paid to certain features of relevance to the present invention.

The WWW uses the Internet for interconnectivity. Internet is a system that connects together networks on a worldwide basis. Internet is based on the TCP/IP protocol suite and provides connectivity to networks that also use TCP/IP. For an entity to have a presence on the Internet, it needs both access to a network connected to the Internet and an IP address. IP addresses are hierarchically structured. Generally an entity will be identified at the user level by a name that can be resolved into the corresponding IP address by the Domain Name System (DNS) of the Internet.

Operation of the WWW

Referring now to FIG. 3 of the accompanying drawings, access to the Internet 30 may be by direct connection to a network that is itself directly or indirectly connected to the Internet; such an arrangement is represented by terminal 31 in FIG. 3 (this terminal may, for example, be a Unix workstation or a PC). Having a connection to the Internet of this form is known as having 'network access'. Any entity that has network access to the Internet may act as a server on the Internet provided it has sufficient associated functionality; in FIG. 3, entity 32 with file store 37 acts as a server.

Many users of the WWW do not have network access to the Internet but instead access the Internet via an Internet service provider, ISP, 33 that does have network access. In this case, the user terminal 34 will generally communicate with the ISP 33 over the public telephone system using a modem and employing either SLIP (Serial Line Interface Protocol) or PPP (Point-to-Point Protocol). These protocols allow Internet packets to traverse ordinary telephone lines. Access to the Internet of this form is known as "dialup IP" access. With this access method, the user terminal 34 is temporarily allocated an IP address during each user session; however, since this IP address may differ between sessions, it is not practical for the entity 34 to act as a server.

A cornerstone of the WWW is its ability to address particular information resources by means of an Uniform Resource Identifier (URI) that will generally be either a Uniform Resource Locator (URL) that identifies a resource by location, or a Uniform Resource Name (URN) that can be resolved into an URL. By way of example, a full or "absolute" URL will comprise the following elements:

scheme—this is the access scheme to be used to access the resource of interest;

host—the Internet host domain name or IP address;

port—the host port for the (TCP) connection;

abs-path—the absolute path of the resource on the host. In fact, the 'port' may be omitted in which case port 80 is assumed.

FIG. 4 of the accompanying drawings shows an example URL for the Hewlett-Packard products welcome page. In this case, the elements are:

scheme—http host—www.hp.com port—omitted (port 80 assumed)

abs-path—Products.html

The HTTP protocol is based on a request/response paradigm. Referring again to FIG. 3 of the drawings, given a particular URI identifying a resource 30 to be accessed, a client establishes a connection with the server 31 corresponding to the "host" element of the URI and sends a request to the server. This request includes a request method, and the "Request-URI" (which is generally just the absolute path of the resource on the server as identified by the "abs-path" element of the URI); the request may include additional data elements. The server 31 then accesses the resource 36 (here held on storage 37) and responds and this response may include an entity of a type identified by a MIME (Multipurpose Internet Mail Extensions) type also included in the response.

The two main request methods are: p1 GET—This method results in the retrieval of whatever information (in the form of an entity) is identified by the Request-URI. It is important to note that if the Request-URI refers to a data-producing process, it is the produced data which is returned as the entity in the response and not the source text of the process.

POST—This method is used to request that the destination server accept the entity enclosed in the request as a new subordinate of the resource identified by the Request-URI. The POST method can be used for annotation of existing resources, providing a message to a bulletin board, providing data to a data-handling process (for example, data produced as the result of submitting a form), and extending a database through an append operation.

In summary, the GET method can be used to directly retrieve data, or to trigger any process that will return an entity (which may either be data or a simply an indication of the result of running the process). The POST method is used for registering data and specifying this method is also effective to trigger a process in the server to handle the posted data appropriately.

The passing of information to a process triggered to run on a server using either the GET or POST method is currently done according to an interface called the Common Gateway Interface (CGI). The receiving process is often written in a scripting language though this is not essential. Typically, the triggered server script is used for interfacing to a database to service a query included in a GET request. Another use, already referred to, is to append data associated with a POST request to a database.

Other important factors in the success of the WWW is the use of the HyperText Markup Language (HTML) for representing the makeup of documents transferred over the WWW, and the availability of powerful graphical Web browsers, such as Netscape and Mosaic, for interpreting such documents in a client terminal to present them to a user. Basically, HTML is used to identify each part of a document, such as a title, or a graphic, and it is then up to the browser running in the client terminal to decide how to display each document part. However, HTML is more than this—it also enables a URI and a request method to be associated with any element of a document (such as a particular word or an image) so that when a user points to and clicks on that element, the resource identified by the URI is accessed according to the scheme (protocol) and request method specified. This arrangement provides a hyperlink from one document to another. Using such hyperlinks, a user at a client terminal can skip effortlessly from one document downloaded from a server on one side of the world, to another document located on a server on the other side of the world. Since a document created by one author may include a hyperlink to a document created by another, an extremely powerful document cross-referring system results with no central bureaucratic control.

Hyperlinks are not the only intelligence that can be built into an HTML document. Another powerful feature is the ability to fill in a downloaded "Form" document on screen and then activate a 'commit' graphical button in order to have the entered information passed to a resource (such as a database) designed to collect such information. This is achieved by associating the POST request method with the 'commit' button together with the URI of the database resource; activating the 'commit' button results in the entered information being posted to the identified resource where it is appropriately handled.

Another powerful possibility is the association of program code (generally scripts to be interpreted) with particular documents elements, such as graphical buttons, this code being executed upon the button being activated. This opens up the possibility of users downloading program code from a resource and then running the code.

It will be appreciated by persons skilled in the art that HTML is only one of several currently available scripting languages delivering the functionality outlined above and it may be expected that any serious Web browser will have built-in support for multiple scripting languages. For example, Netscape 2.0 supports HTML 3.0, Java and LiveScript (the latter being Netscape proprietary scripting Language).

The importance of the role of the graphical Web browser itself should not be overlooked. As well as the ability to support multiple scripting languages, a Web browser should provide built-in support for standard media types, and the ability to load and execute programs in the client, amongst other features. These browsers may be viewed as operating systems for WWW interaction.

WWW and the Telephone Network

It is possible to provide a telephony service over the Internet between connected terminals by digitising voice input and sending it over the Internet in discrete packets for reassembly at the receiving terminal. This is an example of a communication service on the Internet. Conversely, it is possible to point to a variety of information services provided over the telephone system, such as the Minitel system widely available in France. However, these encroachments into each anothers traditional territories pose no real threat to either the Internet or the public telephone system.

Of more interest are areas of cooperative use of the Internet and the telephone system. In fact, one such area has existed for some considerable time and has been outlined above with reference to FIG. 4, namely the use of a modem link over the PSTN from a user computer 34 to an Internet service provider 33 in order to obtain dialup IP access to the Internet. This cooperative use is of a very simple nature, namely the setting up of a bearer channel over the PSTN for subsequently generated Internet traffic; there is no true interaction between the Internet and the PSTN.

Another known example of the cooperative use of the Internet and PSTN is a recently launched service by which an Internet user with a sound card in his/her terminal computer can make a voice call to a standard telephone anywhere in the world. This is achieved by transferring digitised voice over the Internet to a service provider near the destination telephone; this service provider then connects into the local PSTN to access the desired phone and transfers across into the local PSTN the voice traffic received over the Internet. Voice input from the called telephone is handled in the reverse manner. Key to this service is the ability to identify the service provider local (in telephony charging terms) to the destination phone. This arrangement, whilst offering the prospect of competition for the telecom operators for long distance calls, is again a simple chaining together of the Internet and PSTN. It may, however, be noted that in this case it is necessary to provide at least a minimum of feedback to the Internet calling party on the progress of call set to the destination telephone over the PSTN local to that telephone; this feedback need only be in terms of whether or not the call has succeeded.

A more synergistic relationship between the PSTN and WWW worlds is achieved by the arrangement described in the following Patent Applications assigned to the same assignee and incorporated herein by reference:

PCT/GB96/03048 filed Dec. 11, 1996 "Method of providing telecommunication services" Corresponding U.S. application (National Stage) Ser. No. 09/077,509 (Granted as U.S. Pat. No. 6,282,281)

PCT/GB96/03049 filed Dec. 11, 1996 "Call setup gateway for telecommunications system" Corresponding U.S. application (National Stage) Ser. No. 09/091,065

PCT/GB96/03051 filed Dec. 11, 1996 "Method of providing telecommunication services" Corresponding U.S. application (National Stage) Ser. No. 09/077,911 (Granted as U.S. Pat. No. 6,246,758)

PCT/GB96/03054 filed Dec. 11, 1996 "Method of accessing a target entity over a communications network" Corresponding U.S. application (National Stage) Ser. No. 09/091,061 (Granted as U.S. Pat. No. 6,131,095)

PCT/GB96/03055 filed Dec. 11, 1996 "Method of accessing service resource items that are for use in a telecommunications system" Corresponding U.S. application (National Stage) Ser. No. 09/077,795 (Granted as U.S. Pat. No. 6,466,570)

These applications are hereinafter as the "aforementioned Patent Applications".

The arrangement described in the aforementioned Patent Applications is illustrated in outline in FIG. 5 of the accompanying drawings and involves the provision of so-called "service resource items" on WWW servers 40 on "phone" web pages 41 of telephone users (such as user B). These service resource items have been specified by the phone page owner B (typically using a webclient computer 42) to provide one or more customised services in the PSTN for user B. For example, if user B subscribes to an alternative-number service that is triggered to try an alternative number for B if there is no reply from B's main number, then the alternative number may be stored on B's phone page as the customised service resource item for that service. Now if during call setup of, for example, a call from user A to user B, there is no reply from B's main number, a service request for the alternative number service will be generated by an SSP 44 of the PSTN and passed to SCP 45. SCP 45 acts as a gateway to the WWW and upon receiving the alternative-number service request for B, SCP 45 reaches out over the WWW to retrieve the alternative number to be tried from B's phone page. Thereafter, SCP 45 instructs the SSP 44 to try this alternative number. The advantage of this arrangement is that B can readily change his alternative number stored on phone page 41. The foregoing example is a fairly simple one and a much greater degree of customisation can be achieved where the retrieved service resource item is service logic to be run by the SCP to provide a desired service.

In order for SCP 45 to be able to retrieve the appropriate service resource item for a particular service, the resource item must be identified uniquely by a code; this code will typically include the telephone number of the called or calling party (depending whether the service is a called or calling party service), possibly together with other parameters such as the point-in-call where the service request was triggered. The service resource code is translated by the SCP 45 into the URI of the phone page holding the desired resource thereby enabling retrieval of the desired service resource item. Details of how service resource codes are constructed and converted into URIs are to be found in the aforesaid Patent Applications together with details regarding provisioning of the server 40 with resource items.

The aforesaid Patent Applications are primarily concerned with the accessing of service control logic and data over the WWW for use in call setup/takedown. Very little is said about the passing of information (content) to a telephone user, either to assist in the process of service provision or otherwise, and it is an object of the present invention to provide for greater flexibility in service provision by enabling non-standard content and logic to be used together.

SUMMARY OF THE INVENTION

According to one aspect of the present invention, there is provided a service node for providing services in a telecommunications system that includes a bearer network for transmitting content between users, said service node comprising:

receiving means for receiving and temporarily storing service logic programs and associated content that are normally held remote from the service node;

first control means responsive to an indication that a particular service associated with a particular user at least may soon be requested, to cause said receiving means to receive and store a particular said service logic program corresponding to said particular service;

execution means for executing service logic programs;

second control means responsive to a service request for said particular service, to cause the corresponding said particular logic program, received and stored by said receiving means, to be executed by said execution means; and bearer-network transmit means operable under control of a said particular service logic program executing on said execution means, to deliver to said bearer network said content received by said receiving means which is associated with said particular service logic program.

Preferably, the service node includes a computer-network interface for connection to a computer network that is generally accessible to the users of the telecommunications system but is logically distinct from the latter, the receiving means being operative to receive said service logic programs and content through said computer-network interface.

It is to be understood that reference in the foregoing to the computer network being logically distinct from the telecommunications system is not to be taken to imply that there is physical separation of the two—indeed, there will frequently be joint use of the same physical infrastructure. Furthermore, not only may bearer channels set up in the telecommunications system share the same transmission medium as the computer network, but such a bearer channel may act as a pipe for traffic across the computer network. As regards the computer network being generally accessible to users of the telecommunications system, this should not be construed that all users of the telecommunications system have such access or can get such access; rather, it should be understood as meaning that a significant proportion of these users have or can obtain access to the computer network. The intention is to exclude computer networks that are dedicated to the management or monitoring of the bearer network and effectively form part of the telecommunications system itself.

By way of example, in one case the computer network generally accessible to users of the telecommunications system but logically distinct from it, may be the Internet and the telecommunications system may be a public telephone system (PSTN or PLMN). In another case, the telecommunication system may be a private system including a PABX, and the computer network may be an intranet.

According to another aspect of the present invention, there is provided a method of providing services in a telecommunications system that includes a bearer network and a node providing a service execution environment for running service logic programs; said method involving uploading a service logic program over the bearer network from a user device for temporary storage and execution in said node. This uploading may be effected at the time the service logic program is required (in which case the program is executed when received), or else the uploading is done on a pre-emptive basis in response to an indication that the program may soon be needed.

According to a further aspect of the present invention, there is provided a method of providing services in a telecommunications system that includes a bearer network and a node providing a service execution environment for running service logic programs; said method involving transferring a service logic program to said node for temporary storage in response to an indication that said program may soon be required, and thereafter executing said program in said node when a service request invoking that program is received by that node. This indication is, for example, an indication that a user having a right to the service provided by the service logic program, has entered the coverage area of the node.

According to a still further aspect of the present invention, there is provided a method of providing services in a telecommunications system that includes a bearer network and a node providing a service execution environment for running service logic programs; said method involving transferring a service logic program to said node for temporary storage and execution in said node, and following execution of the program at the node in response to a service request invoking that program, retaining said service logic program at the node for no longer than a predetermined period, receipt at said node of a further service request for that program whilst it is still retained at the node, resulting in the re-execution of the program.

According to a yet further aspect of the present invention, there is provided a method of providing services in a telecommunications system that includes a bearer network and a node providing a service execution environment for running service logic programs; said method involving controlling a requested service by transferring multiple service logic programs from different sources to the node and executing these programs, said programs interacting with each other to provide said service. Said multiple service logic programs may, for example, comprise an applet provided by a calling party and another applet provided by a called party.

In the last preceding four statements of invention, the node provided with a service execution environment is, for example, an SCP, Adjunct, or Service Node in the case where the telephone system is a PSTN.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

In the following description the following teminology is used:

V-SHOP: (Voice Services Home Page) This term is used as shorthand for the general arrangement described below in which service logic and content items for voice services are retrieved across the WWW from the Subscriber Voice Service Home Page of a telephone user to a Service Node for use in implementing a requested service.

V-let: the program downloaded from the host WWW server to a gateway of the Service Node (V-let=Voice applet). This host WWW server is later defined as the repository server.

Voice Service browser: The environment provided by the Service Node that allows for execution of the V-lets.

Homelet: The program (Voice servlet) that executes on the WWW repository server, and from which the V-let is issued.

Subscriber Voice Service Home Page: The logical component that contains the subscriber dynamic profile. It is an aggregation of the V-let, the Homelet and additional items or data that characterize the subscriber. Associated with the Subscriber Home Page is a network address (URL) that is used to access the home page within the Web network.

Home Page Repository: The entity that contains the definition of the subscriber Voice Service Home Page. A Service Repository is typically a WWW network server; however nothing prevents the Service Repository from being a PC, palmtop or intelligent mobile phone connected to the network.

Content Items: (Content) These are information items for delivery to a user over the bearer network. Content items may be embedded in V-lets or held in separate data files. Examples are voice annoucements, voice messages and the like. Frequently they will be text data to be converted into voice at the Service Node for delivery over the bearer network.

General Architecture and Scenario

Figure 1:
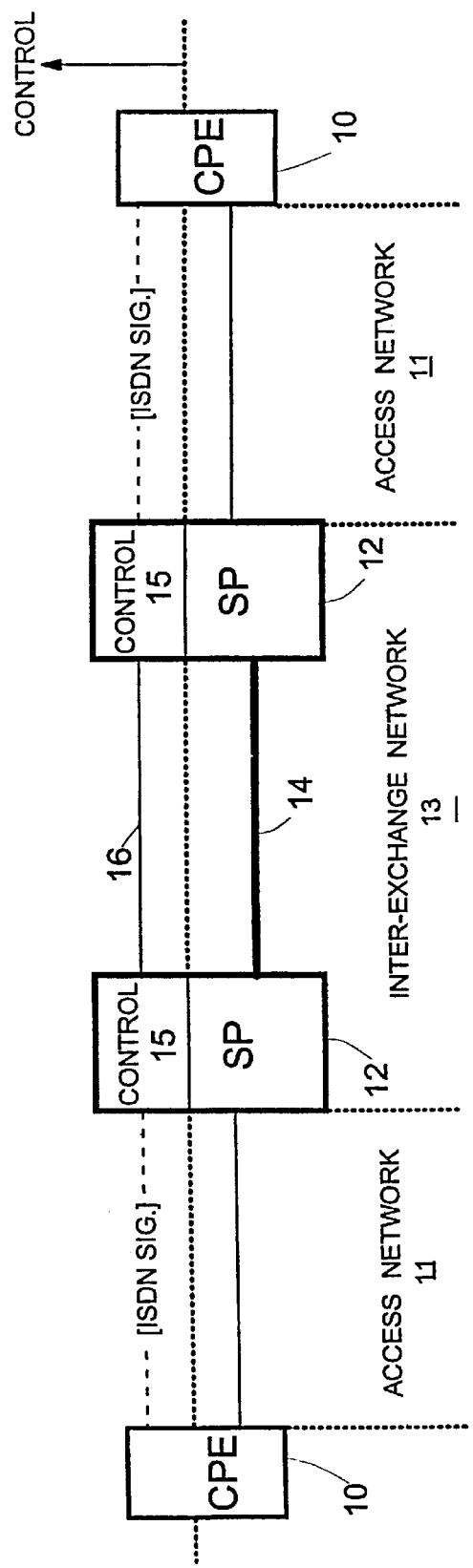
FIG. 1 is a simplified representation of a public switched telephone network (PSTN)
Figure 2:
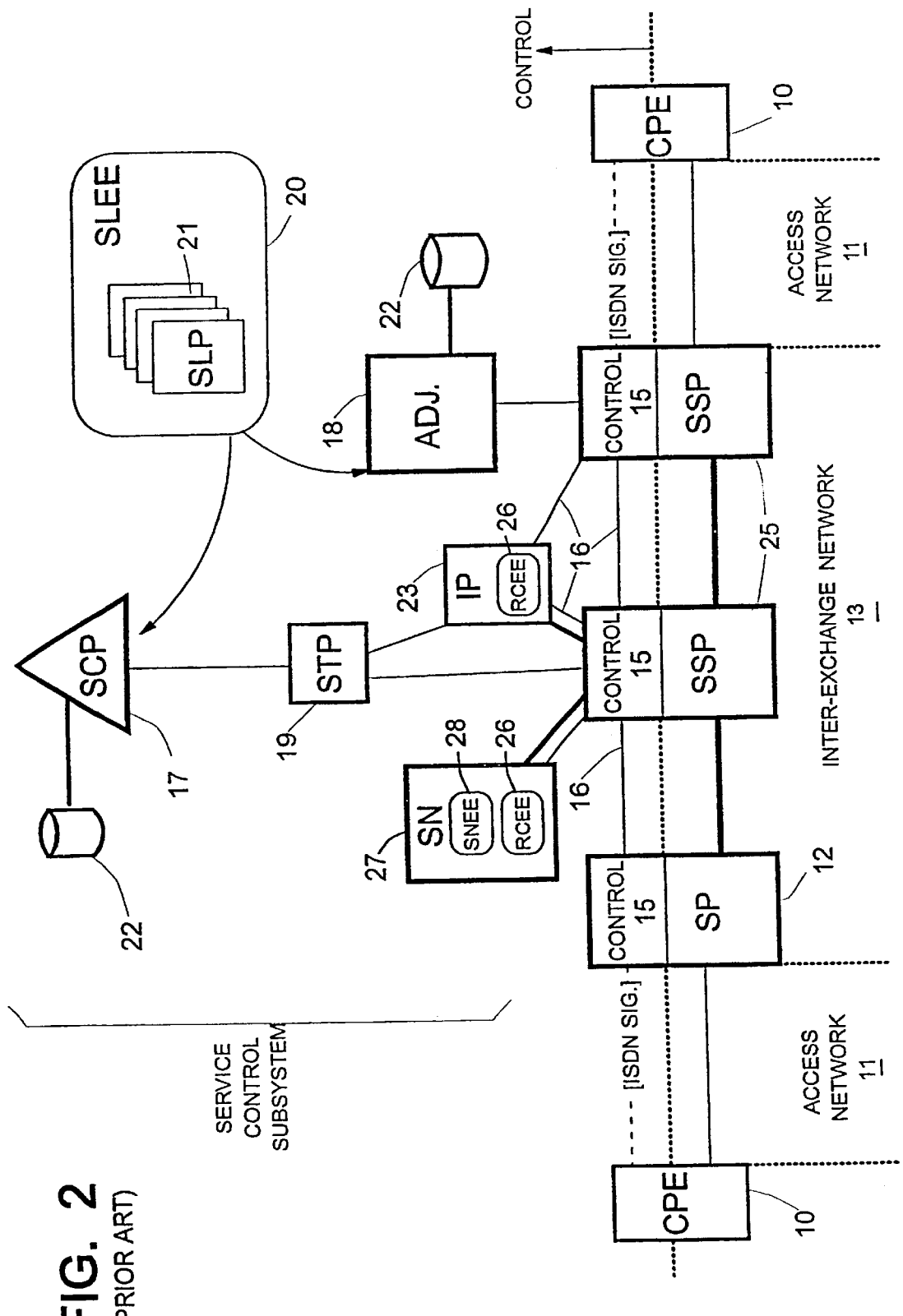
FIG. 2 is a representation of a PSTN provided with IN capability including a service node.
Figures 3, 4:
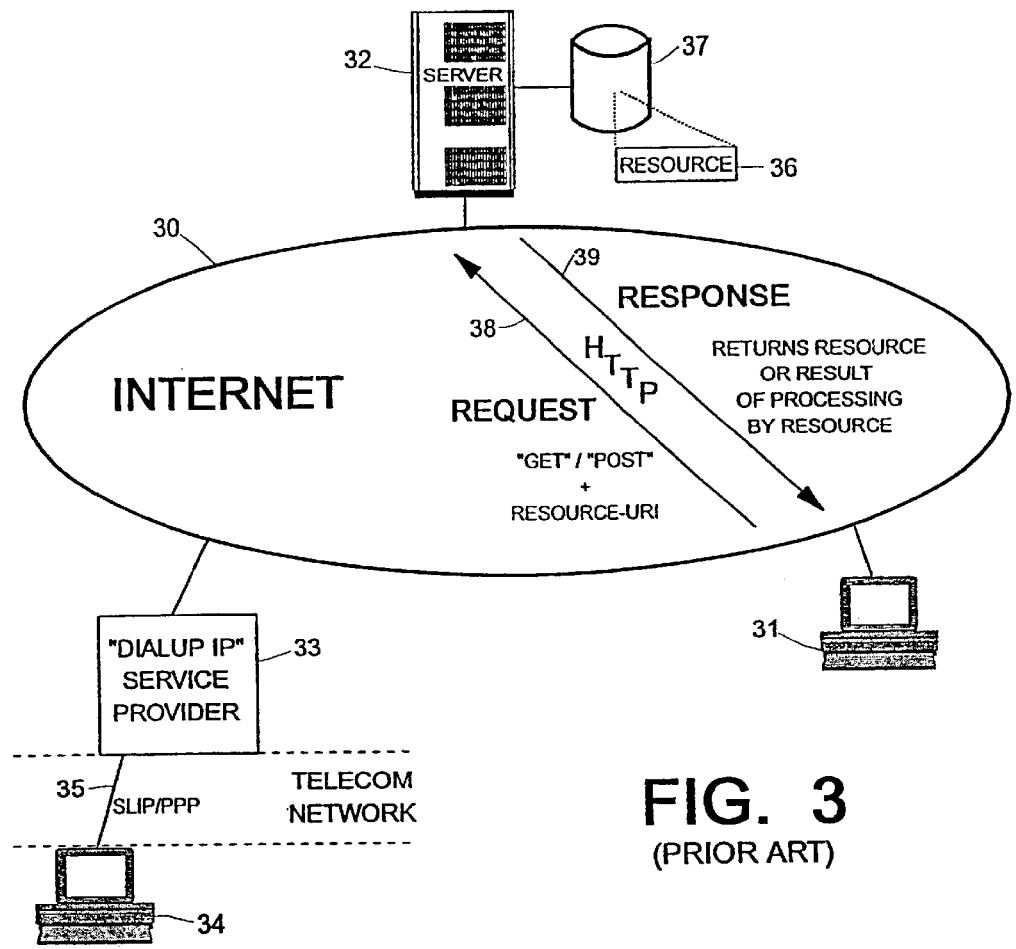
FIG. 3 is a diagrammatic representation of the World Wide Web (WWW) service operating over the Internet.
FIG. 4 shows the structure of a URL.
Figure 5:
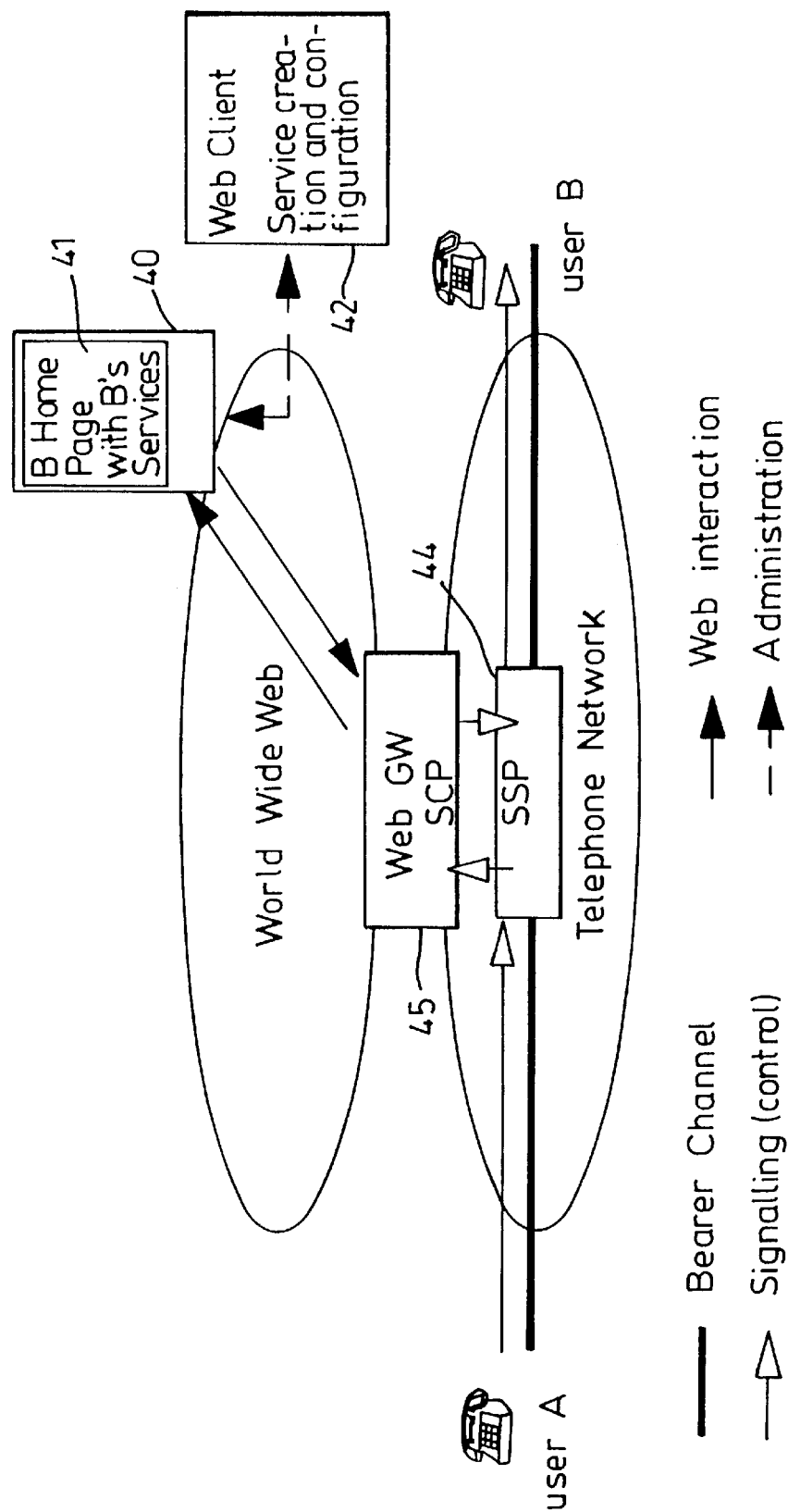
FIG. 5 is a diagram illustrating an arrangement in which IN service resource items are provided to a PSTN over the WWW.
Figure 6:
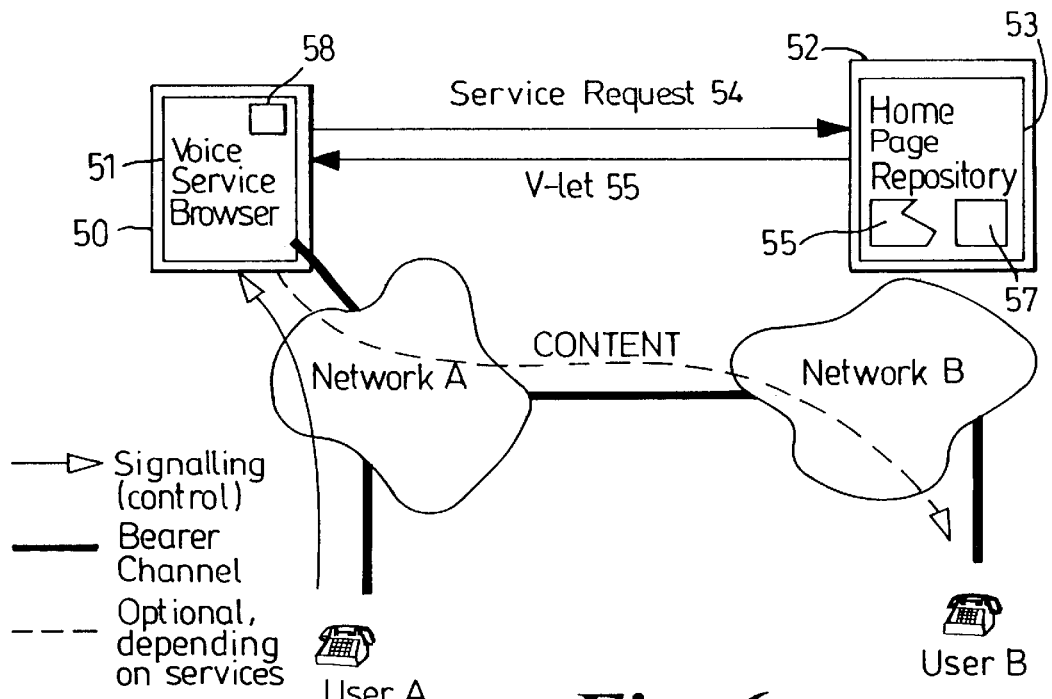
FIG. 6 illustrates a general V-SHOP system embodying the present invention.
Figure 7:
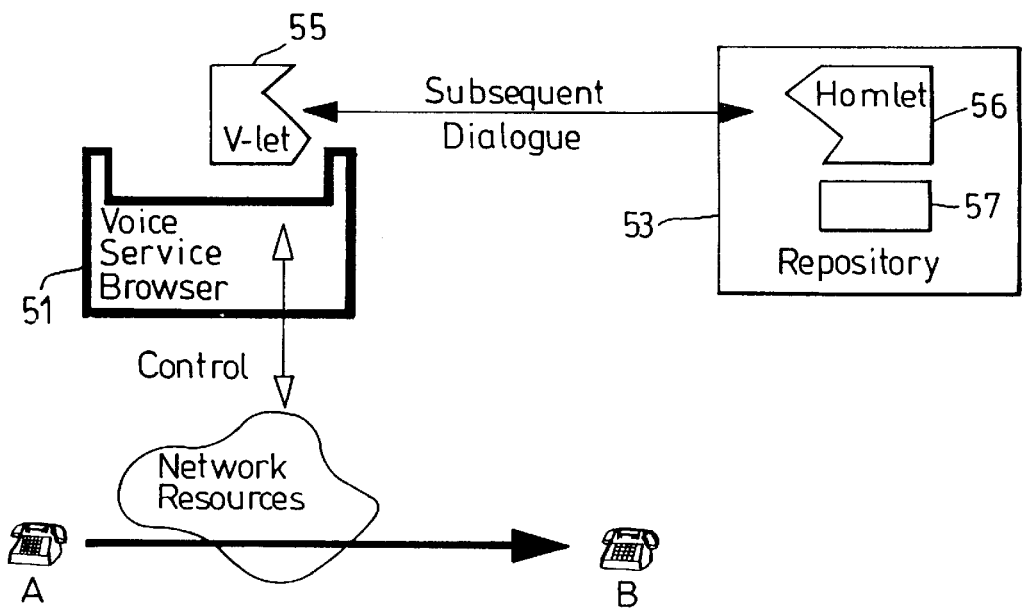
FIG. 7 is a diagram illustrating how in operation of the FIG. 6 V-SHOP system a V-let service logic program is downloaded to a voice service browser.

FIG. 6 illustrates the V-SHOP functional architecture. When a call from User A comes in, it is routed to a network node 50 that has a Voice Service Browser 51. A welcome service 58 is activated that among other operations obtains the URL of the subscriber Home Page 53 on WWW server 52 (for clarity, the usual WWW "cloud' has been omitted in this and following Figures). The way this URL is obtained is discussed latter. A Query 54 is sent to the Home Page, and a V-let 55 is received in return. Once the V-let 55 is downloaded into the Voice Service Browser 51 the software configuration will typically be as depicted in FIG. 7. More particularly, the V-let 55 is downloaded to the Service Browser for execution, a Homelet 56 is also activated in the server 52. A reference to the Homelet (a URL) is contained in the V-let 55; this allows for subsequent interaction with the home page within the envelope of the same session. Classical Web mechanisms for sharing states between remote entities can be used appropriately here.

Supplementary data or service logic (Sub-V-let) can be further queried if required; this will depend on the service to be offered.

It should be noted that the Homelet URL and Home Page URL are not necessary the same. The Homelet instance is dedicated to this service interaction, whereas the Home Page is always, present, even if there is no call active. It is possible to handle simultaneous accesses to the Home Page, while keeping a certain level of independency between them.

The V-let 55 is executed and delivers a customized service to the user by:

interacting with the Homelet 56, as described above.

possibly interfacing with other Web resources whose URLs it gets from the Homelet 56.

controlling the local network resources by means of APIs it has access to within the Voice Service Browser 51. These resources can be either hardware resources such as switching resources, specialized cards, or software resources such as dedicated algorithms or more advanced applications.

Handling the interaction with the user including the delivery of content items 57 fetched from the users Home Page Repository either embedded in a V-let or contained in a separate file. In the latter case, the content item may be fetched at the same time as the V-let 55 or as required.

possibly processing the content data 57 prior to delivery to a user.

Figure 8:
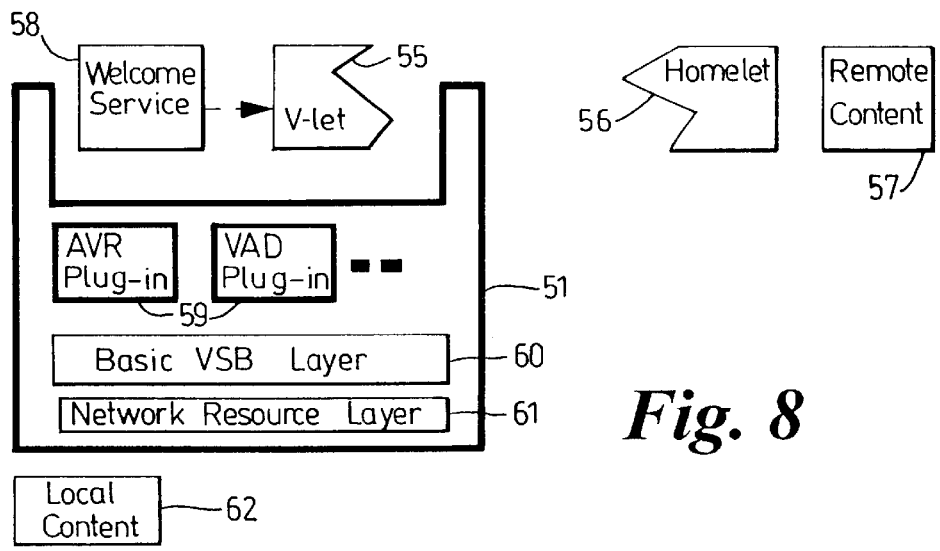
FIG. 8 is a diagram illustrusting the software components of a V-SHOP system.

As illustrated in FIG. 8, the main software components for V-SHOP are:

Voice Service Browser 51

The principles of a Voice Service Browser can be compared to those of a Web Browser. The Browser receives information and processes it according to the information format, and the capabilities it can access locally. It provides additional features like security, caching and the like. The Voice Service Browser 51 comprises a basic voice service browser (VSB) layer 60, a network resource layer 61, and zero, one or more voice plug-ins 59. The VSB layer 60 gives an abstraction of the resources and basic capabilities that a simple Voice Service Browser provides. The network resource layer 61 provides an interface to the resources of the network node hosting the voice service browser 51. Voice plug-ins 59 are applications that extend the capabilities of a simple Voice Service Browser. These capabilities can be used by the V-lets at execution, if they have been written to do so. Examples of Voice plug-ins are algorithms for Voice Activated Dialling, Voice Recognition, complex dialogue handling systems, or simply something like "play this announce and collect up to n digits".

Standard Applets 58.

These are locally-held applications providing standard service elements such as a welcome service, and may use locally-held data files 62.

V-lets (Applets) 55

As already explained they are customized service logic downloaded into the Voice Service Browser at call processing time. Typically, a V-let is a Java applet, but can be written if any other language that can be interpreted by the Voice Service Browser.

Homelets (Servlets).56

Homelets are part of the customized service logic that executes on the Home Page Repository server. As V-lets they can be Java servlets, or cgi-bin scripts.

Data Files (Content).57, 62

Data files are information data generally associated with particular applets. They can be held either locally (62) or remotely (57). These can be of various format. Examples of Data Files are Voice Announcement, Voice Messages/Faxes/Unified Messages, or other subscriber data.

The decision of deploying a new pluggin into the Voice Service Browser needs to take into account criteria as diverse as genericity of the pluggin capabilities, potential usage and of these capabilities, impact on service creation: simplification, maintenance of API (Versioning), impact on network traffic (size of V-lets), Voice Service Browser environment: type of access network, population profile, etc.

Service Examples

Figure 9:
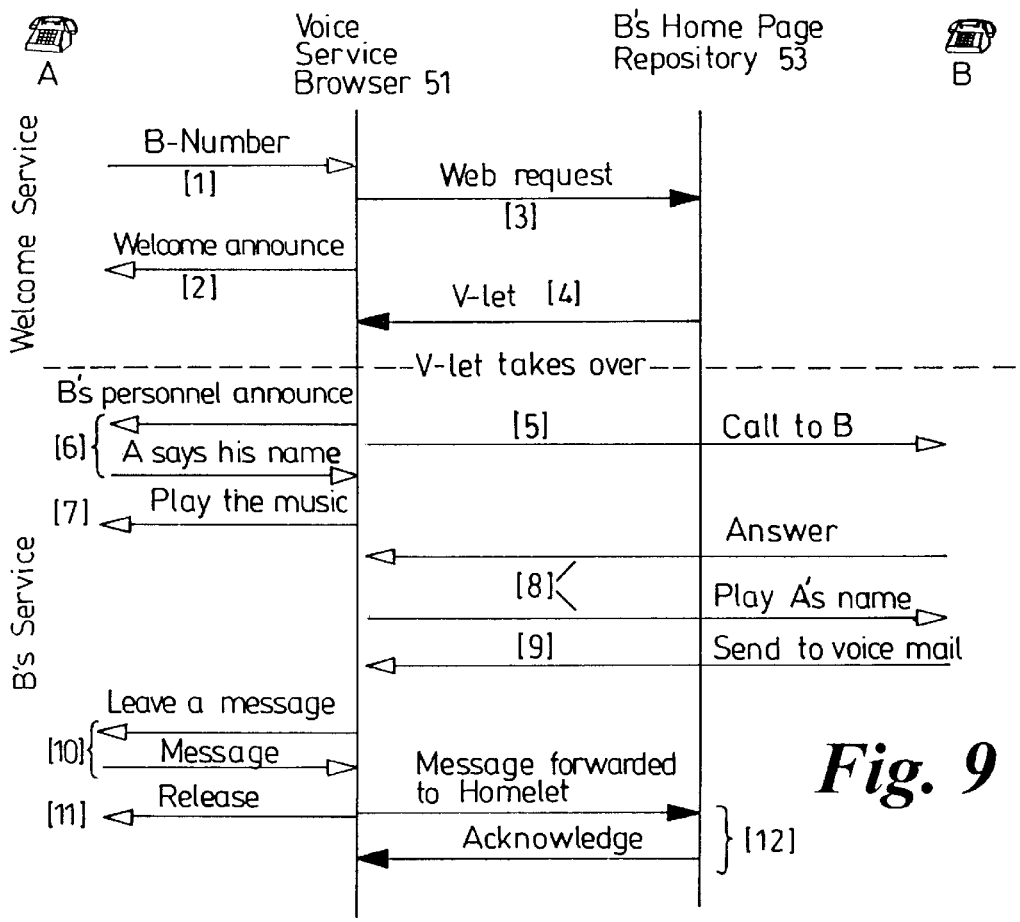
FIG. 9 is a diagram showing the interactions occurring in a V-SHOP system when providing a called-party service.

Example of a called party service—FIG. 9 illustrates the scenario of a customized call screening service. The call is composed of two phases: an initial phase that welcomes the caller A, and a customized phase that handle the call as specified by B. The various steps of the service aare referenced by numbers in square brackets.

Welcome Phase

[1]—A calls B using B's personal number. The call is routed to a Voice Service Browser.

[2]—The Voice Service Browser plays a welcome announce to A.

[3]—In the mean time, the Voice Service Browser resolves B number into an URL and queries the Web for B's V-let.

[4]—B's V-let is received and activated at some time during the welcome announce. B's V-let takes over from the welcome service.

Customized Phase

[5]—A call is placed to a location where B is known to be found. This information is contained in the V-let.

[6]—in the mean time B's V-let plays a personal announce that asks for A's name. A pronounces his name, which is stored as a voice message by the Voice Service Browser.

[7]—A is asked to wait for a while, being prompt by a music, or an announce giving the time of day at B's current location.

[8]—When B answers he his prompted by his customized screening service and can hear the name of the calling party A being played by the Voice Service Browser.

[9]—B refuses to receive the call and presses a key on his phone to forward the call to his Voice Mail. The connection to B is released.

[10]—A is being asked to leave a message, which he does.

[11]—The connection to A is released.

[12]—The Voice Service Browser sends A's voice message to B's Home Page repository. B's Homelet handles the message in an appropriate way.

Steps 1, 2, 6, 7, 10 and 11 involve a local connection across the bearer network to A's telephone, whereas steps 5, 8 and 9 involve a (remote) connection to B's telephone.

Figure 10:
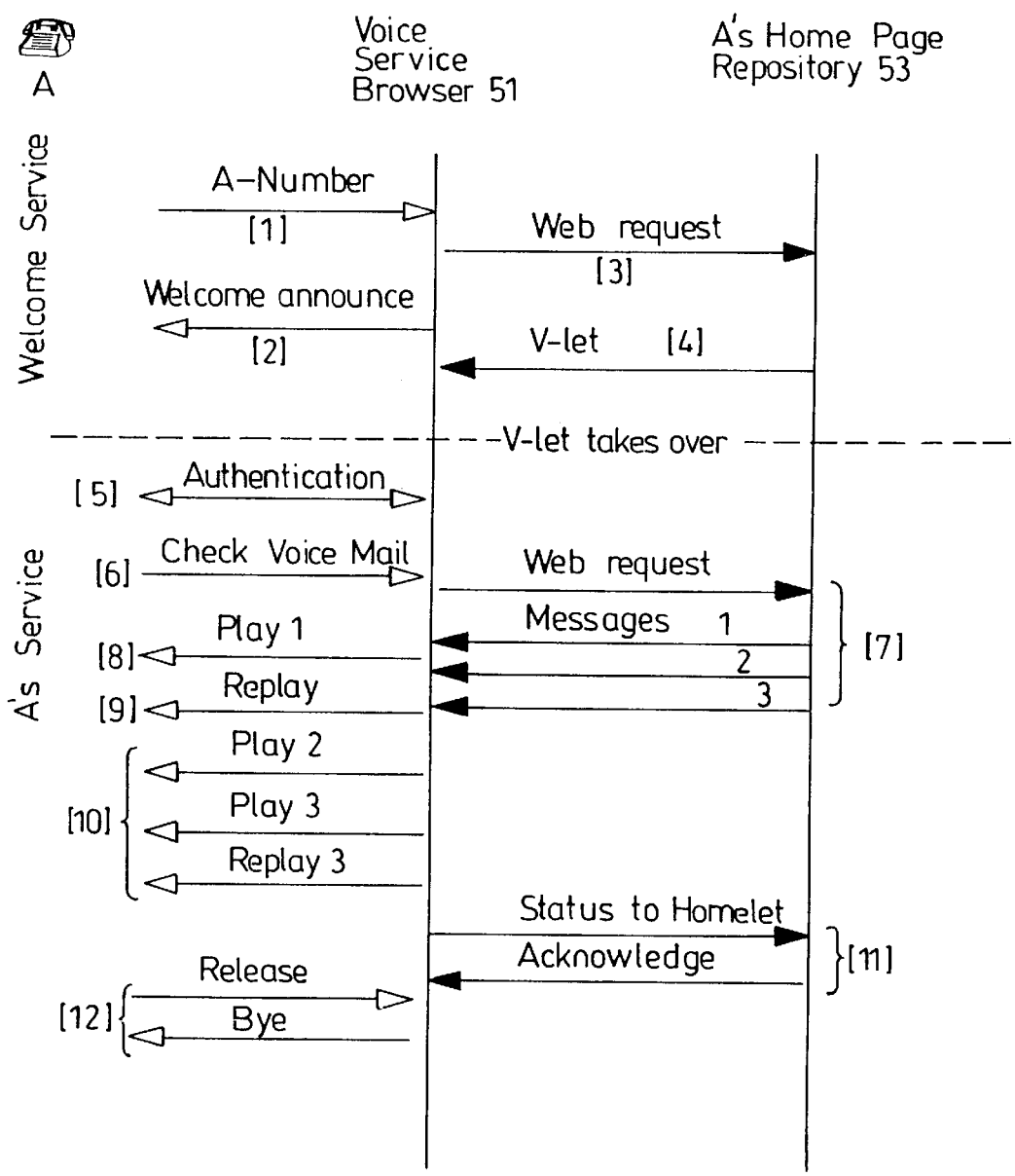
FIG. 10 is a diagram showing the interactions occurring in a V-SHOP system when providing a calling-party service

Example of a calling party service—FIG. 10 illustrates the scenario of a user A that checks his Voice Mail. Again, the service steps are referenced by numbers in square brackets.

Welcome Phase

[1–4]—The Welcome phase is the same as the one described in the previous scenario.

Customized Phase

[5]—Authentication of A is performed, in the way A specified it.

[6]—A presses a particular key on his phone to indicate he wants to check his voice mail.

[7]—A Web request is sent to the Homelet, that sends back A's messages.

[8]—Once the first message is received, it is played to A.

[9]—A couldn't note completely a phone number contained in the message, so he asks for replay.

[10]—A listens to his other messages.

[11]—At the end of the interaction a status message is sent back to the Homelet, informing which messages have to be saved, and which one can be deleted from the MailBox.

[12]—The session terminates.

Steps 1, 2, 5, 6, 8, 9, 10 and 12 involve a local connection over the bearer network to A's telephone. There are not remote connections.

V-SHOP Service Embodiments

There exists many alternatives for implementing V-SHOP depending on which communication environment is targeted. This section first gives general insights on V-SHOP deployment, such as location of components, scalability and addressing. It then discusses particular alternatives for implementing V-SHOP, together with some scenarios. In the following there is no assumption on which phone the user is using to give a call.

Location of components—A V-SHOP subscriber Home Page may be located in a public infrastructure, or private; or it may reside within a PC or a handy belonging to the subscriber. In the same way a V-Let may reside in a public or private environment, or may be cached into a PC, a palmtop, or even a mobile phone. Also the Voice Service Browser may be public or private.

Scalability with distribution—Telecom services have stringent scalability requirements. They are often conceived to serve millions of customers. This is particularly a challenge with interactive voice services; they are very demanding in terms of networking, data storage, and cpu consumption. The solution for such services is to adopt a distributed architecture which is flexible enough to adapt to various range of configurations. This distribution is at four levels: the Home Page servers level, the network level, the Voice Service Browser platform level, and the terminal level.

Home Page server distribution

As much advantage as possible should be taken of the storage and processing capabilities that Web servers can offer, at low cost.

Network Distribution

Voice Service Browsers should be place close to the local exchanges; ideally 1 per local exchange. That is many platforms are to be deployed. In the reality each platform would be located adequately in the network so that it also simplifies the operation and maintenance procedures, hence reducing the operating costs.

Voice Service Browser Platform Distribution

Each Voice Platform is itself a distributed system. A distributed Voice Service Browsers Platform architecture is proposed later in this chapter.

Terminal.

One can benefit from the storage and processing capabilities that advanced terminals provide.

Addressing and service access—The nature of the service one can expect from a V-SHOP implementation depends on the way the service is accessed. That is, what is the semantic attached to the dialled number, how the call is routed to a local Voice Service Browser, how the service is loaded and activated, are those services calling party services or called party services, and alike.

There are three main elements necessary for a V-SHOP service to function:
 the V-SHOP service reference
 the subscriber telephone number or subscriber reference
 the V-SHOP subscriber Voice Service Home Page reference.

The ways this information can be obtained are from the dialled number and following interactions with the calling party, and from the calling ID number. It is up to the local exchange, maybe with the contribution of an IN infrastructure, to route an incoming call to a Voice Service Browser, based on the dialled number. The way the Voice Service Home Page reference is obtained is, given the subscriber telephone number, by doing a lookup into a local database or by any of the other methods described in the aforesaid PCT Applications.

Several Called and Calling party service scenarios will now be described, and how they can be implemented, with and without the contribution of Intelligent Networks.

Called party services in a public infrastructure— Examples of called party services are single number service, call screening, or redirection to voice mail. With called party services, the user may or may not be aware that the service is being used.

Figure 11:
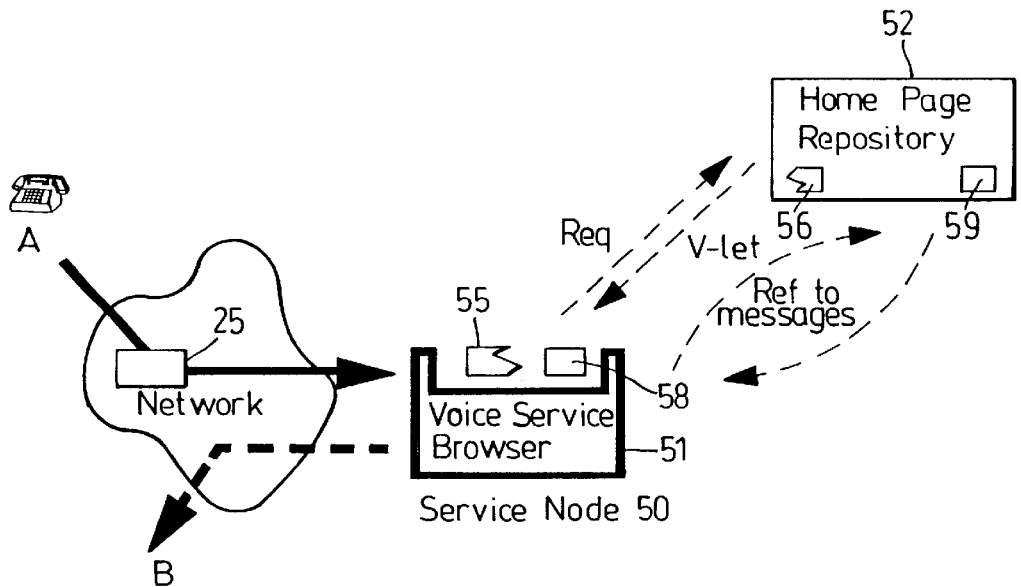
FIG. 11 is a diagram illustrating the use of a V-SHOP system for providing a called-party service in a public infrastructure without recourse to IN capabilities.

>>Without IN (FIG. 11)
 In this implementation the number dialled by the user A is structured as a V-SHOP service access code followed by a subscriber reference. This number is analysed by the switch 25 and the call is routed to a service node 50 that has voice service browser capabilities. Operation proceeds as follows:
  a: On reception of a call attempt the switch 25 detects that the destination number refers to a V-SHOP service.
  b: The switch 25 starts the call setup sequence towards the Voice Service Browser node 50.
  c: The Welcome Service 58 is scheduled in the Voice Service Browser to welcome the call. In the mean time the Voice Service Browser 51 resolves the destination number into an URL address and queries the associated Home Page Repository 52.
  d: The corresponding V-let 55 is returned to the Voice Service Browser 51. The V-let 55 takes over the responsibility of handling the call, as it is defined by the subscriber.
  e: The V-let may contain references to additional subscriber data it querries for processing the service.

>>Use of IN Routing Capabilities
 This scenario uses an IN SCP 17 for routing the call to the voice service browser 51. The SCP 17 is able to maintain additional information that enhances the way the destination voice service browser 51 is chosen. IN also offers a way to re-route the call after it has been handled by the Voice Service Browser 51 without tromboning between the network and the Voice Service Browser node 50.

Figure 12:
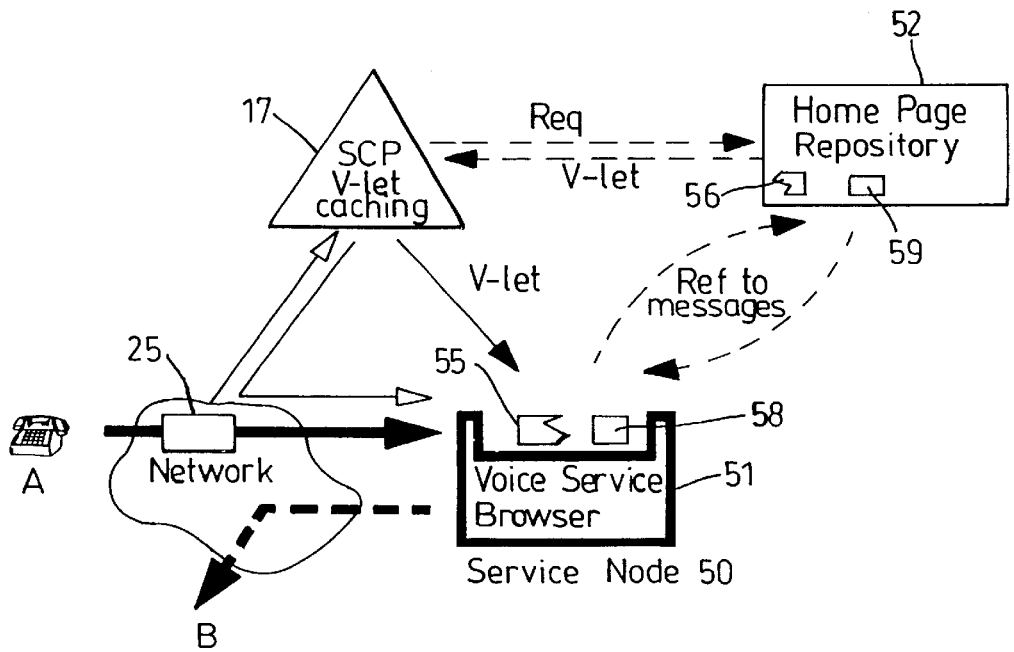
FIG. 12 is a diagram illustrating the use of a V-SHOP system for providing a called-party service in a public infrastructure with the assistance of advanced IN capabilities.

>>Advanced Use of IN Capabilities (FIG. 12)
 In this implementation the IN environment is used for routing the call to a node 50 that has voice service browser capabilities, and for requesting the V-let, and relaying it to the Voice Service Browser 51. This scenario is a variant of the previous IN routing scenario. Its main benefit is that it saves some time for accessing and downloading the subscriber V-let 55 into the Voice Service Browser 51. The SCP 17 is used for V-SHOP service detection and routing of the call to an appropriate Voice Service Browser node 50. A call processing scenario can be the following one:
  a: On reception of a call attempt the switch 25 triggers to the SCP 17.
  b: The SCP 17 detects the destination number refers to a V-SHOP service. It resolves the destination number into an URL address and queries the associated Home Page Repository 52.
  c: The SCP 17 sends a request to the switch 25 to connect the call to an appropriate Voice Service Browser node 50. A correlation ID (C-ID) is passed in the request.
  d: The switch 25 starts the call setup sequence towards the Voice Service Browser node 50. The B-Number is passed.
  e: The Welcome Service 58 is scheduled in the Voice Service Browser 51 to welcome the call.
  f: The V-let 55 is returned to the SCP 17.
  g: the SCP 17 forwards the V-let 55 to the identified Voice Service Browser 51. The forwarding message includes the C-ID for correlation in the Service Browser node. c, d and e happens in parallel with f and g.
  g: On reception of the V-let 55 the Voice Service Browser environment uses the C-ID to determine the Welcome Service 58 instance that held the call. The V-let 55 takes over the responsibility of handling the call, as defined by the subscriber.
  i: The V-let 55 may contain references to additional subscriber data it querries for processing the service.
 The V-let 55 can be cached in the SCP 17 for faster response at the next access from this subscriber in this geographical area. The SCP 17 can be also used to maintain additional information that enhances the way the destination voice service browser is chosen. As noted above, there will be multiple instances of Voice Service Browsers 51 deployed in the network. An operator can choose to have classes of Voice Service Browsers with different capabilities supported. The Voice Service Browser configuration is known in the SCP, that will route calls to Voice Service Browsers of appropriate classes, given the profile of V-SHOP subscribers.

Calling party services in a public infrastructure— Examples of calling party services are voice mail access, voice activated dialling, preferred carrier, virtual private network, or personal secretary service. For calling party service there is a need for identification, and eventually authentication, of the person who calls.

With calling party services it is acceptable to separate the dialling of the V-SHOP service access code from the dialling of the subscriber number. Once the call has been routed to a Voice Service Browser, using a V-SHOP service access code, the user may enter an identification/authentication session from which a subscriber URL number can be derived.

Figure 13:
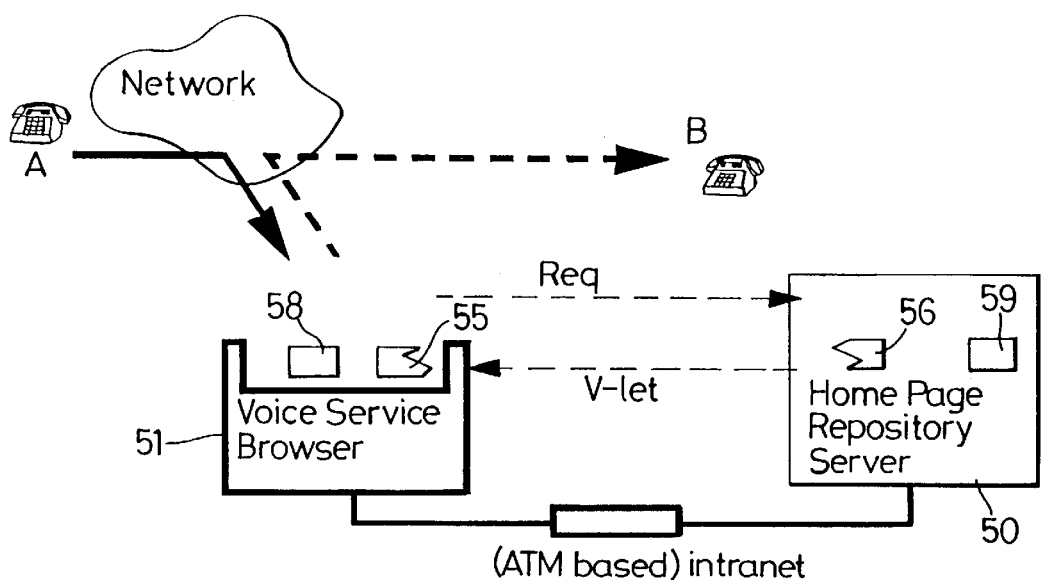
FIG. 13 is a diagram illustrating the use of a V-SHOP system for providing a calling-party service in a public infrastructure without recourse to IN capabilities.

>>Without IN (FIG. 13)
 In this case, it is the responsibility of the network to route the call to the nearest Voice Service Browser 51, in a manner already discussed (the switch(es) is not shown in FIG. 13). The delays in accessing the V-let can be hidden by appropriate design of the Welcome service 58, that provides an identification, then authentication of the user. The time budget obtained from prompting the user for a PIN and obtaining the digits is sufficient for getting the V-let 55 from a remote location. AVR can also be used here. The checking of the user input is then being done in any appropriate way.

The penalties here are that this sequence (V-SHOP Service number+ID+PIN) may be too heavy to handle if the aim of the user is just to give a simple call. However it will sound perfectly natural for interactive customized services where the user is psychologically prepared for such a dialogue, especially if the dialogue is specifically conceived and tuned for his needs.

>>Combined with IN

The use of an IN infrastructure brings similar advantages as with called party services.

V-SHOP in a private environment—There are particularities that come from applying V-SHOP in a private environment; they are mainly to do with the size of the network, the number of subscriber, the way billing is being done, the way service administration can be done, the type of networks being used for signalling and transportation of voice, and network security and boundaries.

The previous scenarios can be realized in an enterprise environment, where a dedicated organisation holds the responsibility of developing and administering the services for the employees.

Figure 14:
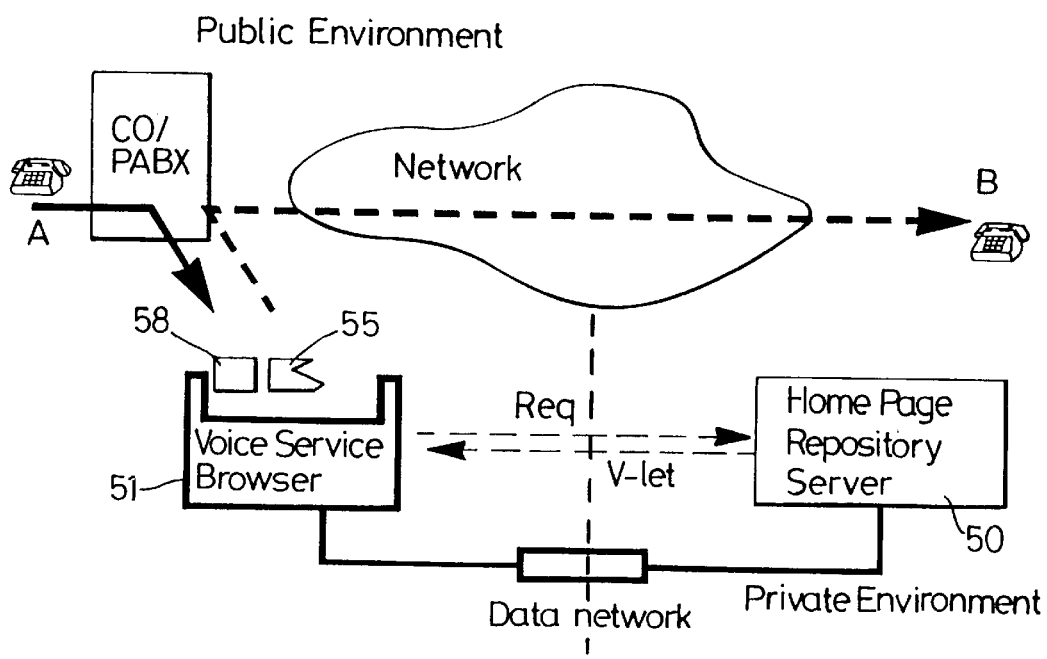
FIG. 14 is a diagram illustrating the use of a V-SHOP system for providing a service in an environment that is at least in part private.

Access to the V-SHOP service can be done through a Voice Service Browser 51 that resides either in a public environment, or is part of the private environment. The Home Page Repository Servers 52 would be in the private environment (see FIG. 14). In this way, the user is able to control:

How the routing of his call is being done, given that he has specific tariff agreements with some carriers, or may take advantage of his enterprise communication network.

How his billing is being done.

And this from anywhere in the world, with the same personal user interface, given that he is given access to a Voice Service Browser.

Figure 15:
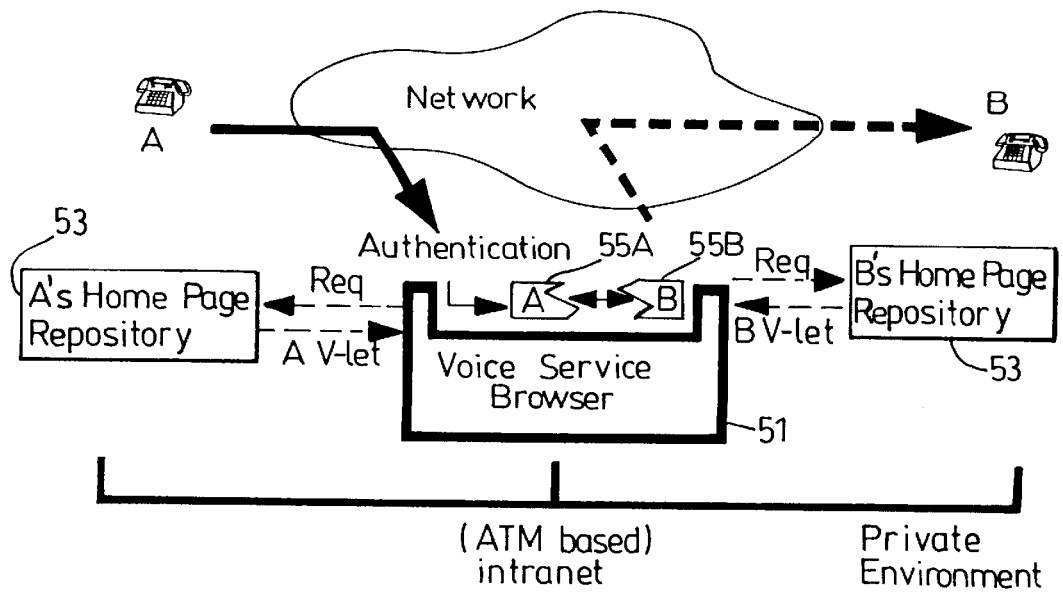
FIG. 15 is a illustrating the use of a V-SHOP system for providing concurrent interactive calling and called-party service in a private environment.

Calling and called party services—FIG. 15 depicts a scenario where both user A and user B are V-SHOP service subscribers. (Note, although the illustrated example is for a private service, the illustrated concept can also be applied to a public environment). In FIG. 15:

When A calls in, the call is handled by A's V-Let 55A, which implements A's personal secretary service.

A gets authenticated, and informs he wants to call B. A gives B's telephone number.

The Voice Service Browser 51 detects B's number is a V-SHOP number. It resolves it into B's URL and downloads B's V-let 55B.

A call is placed to B, according to B's V-let logic.

In this particular scenario, B wanted his calls to be forwarded to his Voice Mail. Activation of B's Voice Mail service is done locally, without the need to setup any network connection. (Another example service would be with B's advanced call screening service).

The FIG. 15 scenario shows that various services alternatives are possible, that optimise the call processing, and prevent the setup of non necessary connections. The combination of A's V-let 55A and B's V-let 55B cooperating within the Voice Service Browser 51 provides a means to offer very powerful innovative services, again at low cost.

This scenario also introduces the notion of inter V-let communication. This communication is local.

Service Node

A voice platform SN 50 is generally composed of a collection of system elements, each supporting specific functions. A voice platform may comprise:

an execution environment (processing nodes) to support call control and service execution, network interface cards to connect to the telephony network, storage systems to store voice messages and customer profiles specialized servers to execute advanced functions (voice recognition etc.)

a LAN to interconnect the platform systems.

a bus to route and get access to voice data.

There are several benefits that may come with a distributed architecture, if sufficient care is taken by platform designers:

Isolation of faults. It makes it easier to limit the impact of a fault occurring in a particular component. System redundancy will allow for taking over the processing of requests in case of failure. A system failure will not impede customers from accessing their services.

Adequation to application requirements. Each application will run on dedicated nodes that are dimensioned and configured for this purpose only. The work of system engineering is made easier. The choice and cost of the platform can be better controlled, according to each application requirements. For instance, a supervision application will run on an HP-UX platform, whereas a Windows-NT platform is better suited for a voice recognition application.

Evolution in applications and technologies. New technologies or application can be introduced without impacting those being already deployed. An operator will be able to take early competitive advantage of newly developed technologies or applications.

Figure 16:
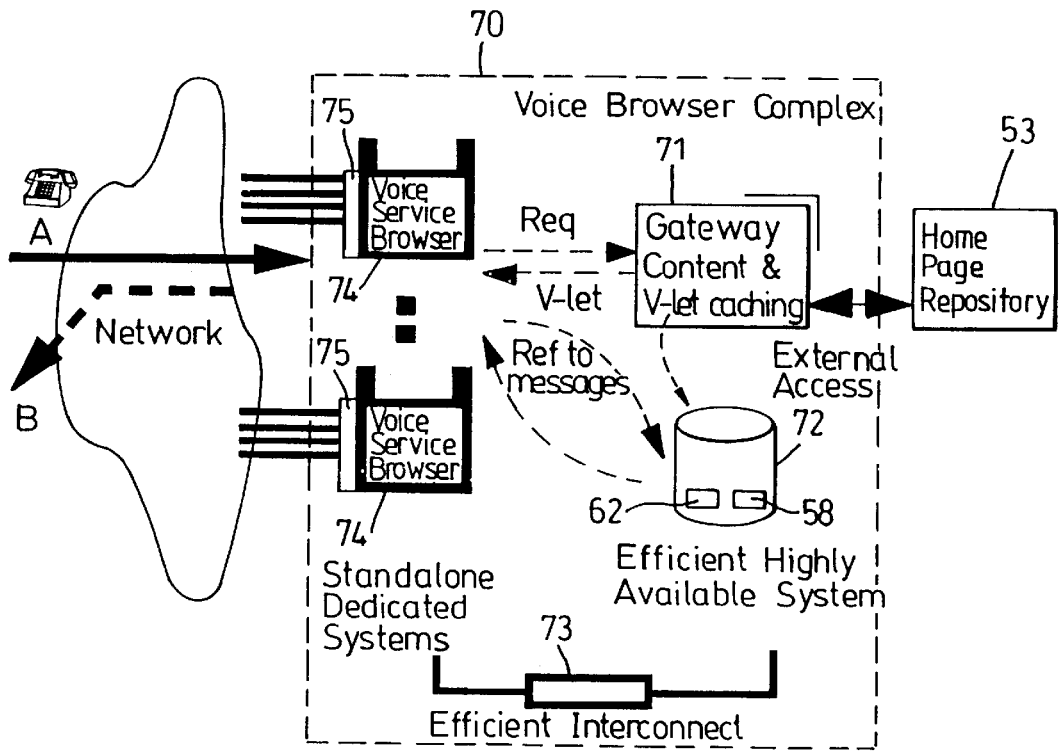
FIG. 16 is a diagram of a voice browser complex.

However there are issues such as operability, manageability, or overall complexity that come along with distributed systems. A service node built to implement the V-SHOP concept significantly reduces these issues. FIG. 16 shows the the general form of an SN employing voice service brower components 74 hosted on network front-ends 75 as part of a voice browser complex 70. As well as the voice service browser components 74 and network front ends 75, the complex 70 includes a gateway 71 for accessing home page repositories 53, storage systems 72 for storing voice messages and customer profiles, and an efficient interconnect 73. The Voice Service Browser component 74 will generally have the following characteristics:

Small scale, stand alone systems (no HA).

Many, to meet different scalability requirements of the platform.

Specialized to support specific pluggins or resource functions.

Specialized to support for various network access

Able to switch calls

Place for technological innovation and new services

Provided by third parties

Have hooks to the Complex Gateway

Held no precious states or information.

The Voice Service Browser Complex Gateway 71 provides efficient and reliable access to any information that is critical for the Voice Service Browser 51 to provide their services. This information, we will call precious states, mainly relates to subscriber profiles (V-Lets, messages, etc.), complex and network configuration, and call context information. The Gateway 71 may access this information through external accesses (e.g to subscriber Home Pages), have it cached, or maintain it locally. The Complex Gateway:

- Is reliable. It is hosted by an efficient, reliable, highly available system;
- Provides the HA framework to the Voice Service Browser systems;
- Encapsulates precious platform and network states;
- Provides global Resource Management;
- Performs the following call control functions:
    routing of calls
    routing to subscriber profiles/data
    Number translation
- Provides access to the external world, e.g external database or web servers;
- With specific customizable logic;
- Provides the framework for application software management and maintenance;
- Downloads service logics (V-lets) into the Service Browsers.

The interconnect 73 linking all system components together may range from a standard 100vgLAN to a switched ATM LAN or Fiber Channel technology.

The Service Node architecture takes advantage of the V-SHOP principles for:

- simplifying the platform and application software management,
- providing a High Availability framework to low cost standalone systems,
- enabling introduction of innovative technologies and application components in the service node as pluggins.

I will be appreciated that in the earlier illustrated embodiments, the voice service browser 51 will generally include similar functional elements to elements 71 to 75 whether in a distributed comples form 70 or in a single-machine architecture.

V-let in the Handset

An interesting case for V-SHOP is the one where a copy of the V-let resides in the Handset. It can be then downloaded into the Voice Service Browser if particular functions have to be performed. These can be:

- particular network resource management tasks,
- authentication with the network or the service,
- advanced voice processing functions not supported by the handset.

Implementation Considerations

Efficient communication.

As the user is interacting with the Voice Service Browser in realtime, it is important to provide sufficient guarantees that the information necessary for the services to execute properly in the Voice Service Browser will be available when needed. This information is mainly service logic, announcements, messages (voice, faxes, unified messages). However the large size of the messages required to transfer this information, and the number of these messages per seconds will impact on the performance of the Data Network. In order to minimise adverse effects a number of measures may be taken, particularly to reduce the quantity of data to be transferred. One approach to reducing the size of messages could be to use compression. This may be used on any kind of data information. Another approach, that would mainly apply to Service Logic data, would be to impose guidelines on designers of complex services.

That is, it is possible to structure the Service Logic applets into a collection of small size applets, and organize them into a hierarchical tree. The top of the tree is the first V-let to be downloaded. Sub V-lets will be downloaded later depending on how the interaction with the user is progressing. What is important here is to have the ability to execute pieces of functionality while others are not available yet.

The same approach can be applied to downloading of voice messages. That is it is not necessary to download all of messages before starting playing the first one. Pieces of information needs to be transferred in the order in which this information is going to be processed of presented first to the user.

Reducing the size of messages, as explained above, and cadencing their transfer is a way to ensure more predictable delays and limit network overloading. Also high speed networks or links can be used for better performance of data transfer.

Service activation—The issue here is how to mask to the users the delays of activating the services, which assumes the necessary information is available into the Voice Service Browser. There are several technics that would allow us to speed service activation:

Small size V-lets
  This method of structuring Service Logic into small applets will reduce the time necessary to activate the top V-let.

Caching
  Also V-lets could be cached within an SCP or a Voice Service Browser Complex Gateway first time that the service is requested in a given geography (or whenever some indication is given that the user is in a given geography which may be through the use of any service or by a registration process, possibly transparent to the user when using his/her handset or terminal). Only the Top V-let may be cached, the latter requesting additional Sub-V-lets as needed (or with a degree of preemption).

Another technic
  is the one illustrated in the Advanced use of IN capabilities scenario (FIG. 12), where the this action of getting the V-let and having it activated can be done simultaneously to routing the call to the Voice Service Browser.

V-SHOP Features

Figure 17:
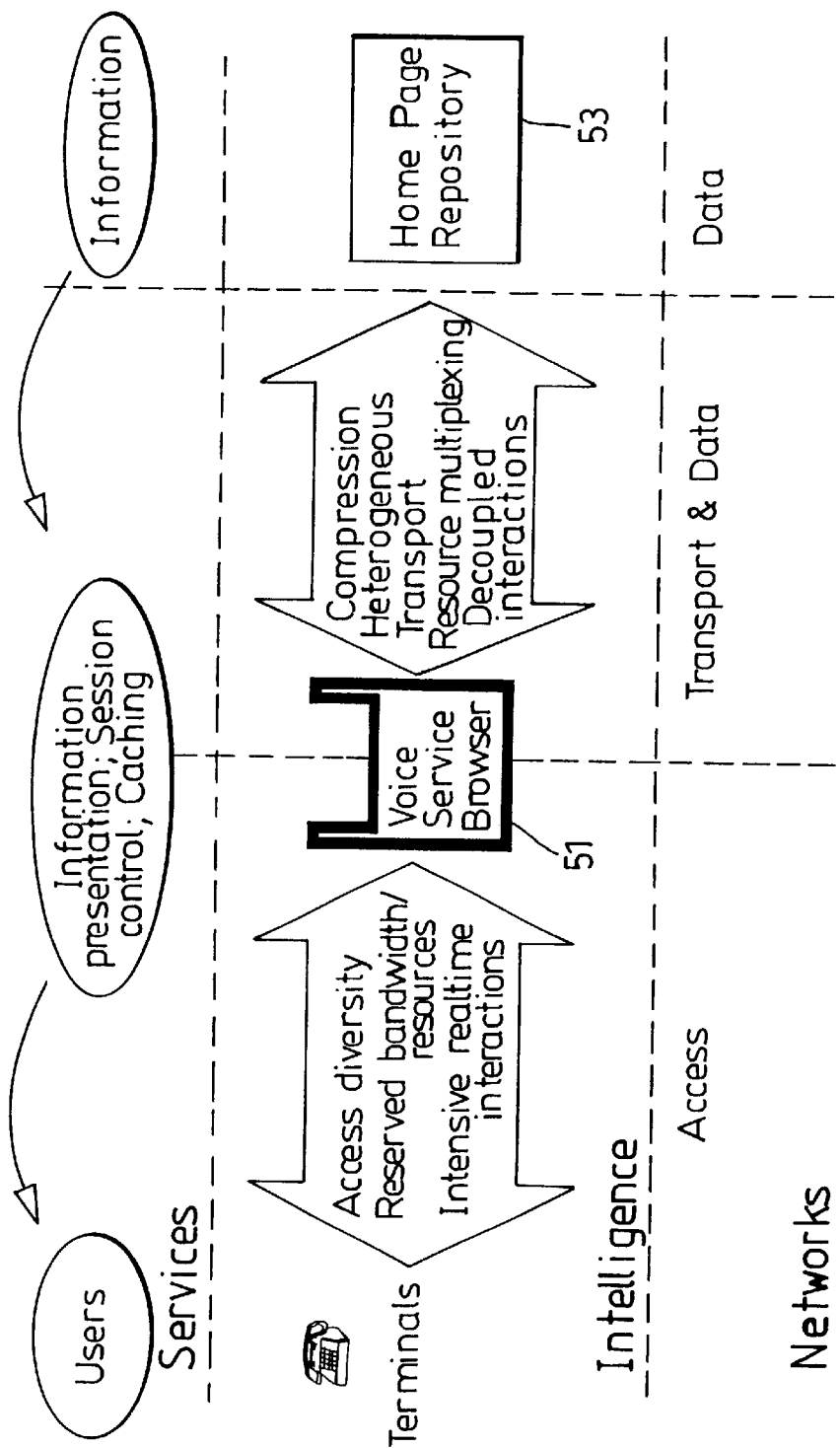
FIG. 17 is a diagram illustrating the conceptual role of the V-SHOP system in the context of services/intelligence/network.

FIG. 17 depicts at a conceptual level the positioning of the components of the V-SHOP architecture in the functional planes of networks, intelligence, and services. This architecture gives rise to a number of notable features:

Clear separation between the businesses of providing a service, and operating a network—As a result the network can be seen as a generic platform independent of services; pluggins can be added that offer common services; Subscriber service logic can be downloaded to perform better or appropriate resource management.

Clear separation between storing data and services, and providing an execution environment for services.—The latter is being done by the Voice Service Browser the main responsibility of which is session control and information presentation in a format that fits the capabilities of the user terminal.

Optimised resource usage—Connection oriented services are required for the transfer of information that have very stringent real-time or QoS requirements, e.g dialogue between two users, interactive video, etc. Such services require allocation of dedicated resources within the telecommunication network. It is very difficult to provide service multiplexing over those resources without degradation of the services.

On the other side data networks offer less guarantees. But they provide better flexibility and higher communication throughput. The result is very often of more flexible, less complex, and less costly infrastructure. This has a direct consequence on the price subscribers and users have to pay to receive a service.

V-SHOP permits the strengths of both kinds of networks to be married, with the most suitable network being used to transfer whatever data is to be delivered. For instance, it normally costs a user a lot to make an international call to check a long list of messages the user has in their voice mail. This could be more effectively done if the user's voice mail service could be run close to the local exchange to which the user is currently connected, and the voice messages transferred over a data network to the voice mail service; the messages would then be played and replayed from there. Such a service implemented using V-SHOP has been described above. The same considerations apply generally to with customized interactive services.

Another example is with tromboning that leads to over allocation of network resources. This undesired phenomenon may results from the combination of different services, all of this to get an announcement in a foreign language asking if you would leave a message.

Decoupling of information transfer and information presentation—Different kinds of scenarios can be imagined, in which part of the information that is necessary to process the call or deliver a service to a user does not necessitate the set-up of expensive connections. The level of indirection that the Voice Service Browser provides brings architectural alternatives to better usage of network resources and better cost structures. Also the Voice Service Browser offers a way to restructure the information and present it in a format that meets the terminal capabilities and the user expectations.

Caching of data and logic—The GSM architecture uses data caching with the notions of VLR (Visiting Location Register) and HLR (Home Location Register) where the information necessary to route the call to a subscriber is cached closely to the user. At least certain V-SHOP embodiments go further by caching service logic and this results in a very flexible architecture that allows the delivery of advanced interactive voice service very quickly, and at low cost. As explained above, caching decreases the need for network communication in real time, and critical resource consumption.

V-SHOP Main Benefits

In addition to the benefits of the above features, V-SHOP embodiments provide a number of other benefits (though not necessarily all benefits are provided by all embodiments).

Personalized services.

By means of a data network such as the Internet, and technologies such as Web technologies, subscribers can master the creation of their services very flexibly. A subscriber may be an individual with or without access to the data network, or an organisation that owns (and operates) a data network.

Very fast service deployment.

The use of a data network (Inter/tranet) for supporting the services results in the ability for deploying the services very rapidly, and in a variety of ways that meets each V-SHOP subscriber particular needs.

Ubiquitous services:

Users can access and use their own services world wide at low cost.

Better control of the subscribers over their services.

Subscribers are able to access and configure their services remotely from any standard terminal equipment, given that they are given the right to do so.

Easier administration of the services.

(Service provider point of view). All the information used for delivering a service to a particular customer are stored in a unique repository. Copies of part of it can be cached in other node. But it is possible to administer the service easily by accessing this central repository. It must be noted that (1) it is not required that all profiles are stored in a same centralized node; (2) that by deporting the repository node inside the Inter/tranet the administration can be done by the user himself, or the organisation to which he belongs.

Simplified network protocols.

Common network protocols such as the ones used in Internet networks (HTTP) can be used as a basement for accessing data and downloading applets or information. The V-let and the Homelets are responsible for the parts of the protocol which are specific to each service. Interoperability becomes a non issue as very often the responsibilities of creating the V-let and the Homelet are with a same organisation.

Full scalability.

As in the WebIN proposal, full scalability is almost for free. Such a benefit usefully results from adopting a distributed architecture. Scalability issues may be categorized according to network bandwidth, addressing, storage capacity, and processing power. The V-SHOP architecture allows for solutions along each of those four lines.

Network bandwidth: High speed links can be provisioned in a data network or leased from a data network operator.

Addressing. The use of URLs brings a full flexibility in the way subscriber profiles are accessed, independently of any network physical considerations.

Data storage: Together with the use of URLs, a large range of configuration is possible. Where the storage requirements go over what a single storage system can provide it is possible to grow by operating multiple sites that have the responsibility of administrating the services for a category of subscribers.

Processing power: Processing power issues can be solved in the same way by addition of processing nodes. It should be noted that storage nodes are decoupled from processing nodes in the architecture.

Such a scalability characteristic allows for optimised evolution and upgrade of the service infrastructure. The appropriate storage and processing capabilities can be placed adequately in the infrastructure, based on requirements coming from service usage and penetration. This is particularly important in the context of voice services where:

execution of voice algorithms (compression, recognition etc.) is very demanding in terms of processing power (especially in cases where these algorithms are implemented in software, and executes on host cpus).

storage needs for user data (messages, user profile) are important.

Reduced costs.

Advanced voice services can be provided by means of a low cost infrastructure. Standard IT equipments and default applications can be easily leveraged for realizing most of the components required for V-SHOP. This results in:

reduced costs for deploying and operating the network, reduced costs for deploying and administrating the services, advanced services provided to the user at a very competitive prices, reduced price for each call, due to optimization of network resources usage. This aspect is particularly important in the context of interactive services.

Variants

Many variants are, of course, possible to the above-described arrangements.

Whilst traditionally a Service Node is provided functionally downstream of an SSP with the latter generating service requests which it passes to the SN for servicing, it is also possible for the SN to be located upstream of any SSP, for example, in the access network. In this case, the SN is responsible for detecting when any of its services are required during call setup/takedown.

It will be appreciated that the term "Internet" is to be understood to include not only the current specification of the TCP/IP protocols used for the Internet and the current addressing scheme, but also evolutions of these features such as may be needed to deal with isochronous media. Furthermore, references to the WWW and the HTTP protocol should equally be understood to encompass their evolved descendants.

The present invention can also be applied to telephone systems other than just PSTNs, for example to PLMNs and other mobile networks, and to private systems using PABXs. In this latter case, a LAN or campus-wide computer network serving generally the same internal users as the PABX, will take the role of the Internet in the described embodiments.

Furthermore, the present invention has application where any switched telecommunication system (for example, a broadband ATM system) requires service control and a computer network can be used for the delivery of service resources to the service control subsystem of the telecommunication system.

What is claimed is:

1. A service node for providing services in a telecommunications system that includes a bearer network for transmitting content between users, said service node comprising:

receiving means for receiving and temporarily storing service logic programs and associated, but separate, content that are normally held remote from the service node;

first control means responsive to an indication that a particular service associated with a particular user at least may soon be requested, to cause said receiving means to receive and store a particular service logic program corresponding to said particular service;

execution means for executing the service logic programs;

second control means responsive to a service request for said particular service, to cause the corresponding said particular logic program, received and stored by said receiving means, to be executed by said execution means;

third control means responsive to said particular service logic program when executing on said execution means to cause the receiving means to receive and store said content associated with said particular service logic program; and bearer-network transmit means operable under control of said particular service logic program executing on said execution means, to deliver to said bearer network said content received by said receiving means which is associated with said particular service logic program.

2. A service node according to claim 1, wherein said receiving means at an instigation of said particular service logic program executing on said execution means, is operative to receive and temporarily store a follow-up service logic program associated with an executing program, said follow-up program being subsequently executed by the execution means in providing the requested service.

3. A service node according to claim 1, wherein said execution means can concurrently execute multiple particular service logic programs with interaction therebetween.

4. A service node according to claim 1, further comprising:

standard-program storage means for long-term storage of standard service logic programs usable in the provision of services to multiple users, standard-content storage means for long-term storage of standard content usable in the provision of services to multiple users, said second control means on receiving said service request being operative to cause the execution of said standard service logic program which initiates the delivery of said standard content through an interface of said bearer network, the second control means thereafter initiating the execution of the said particular service logic program.

5. A service node according to claim 4, wherein said indication to which the said first control means is responsive is said service request, said second control means serving to execute the said particular service logic program corresponding to said service request upon that program being received and stored by said receiving means.

6. A service node according to claim 1, wherein said indication to which the said first control means is responsive is said service request, said second control means serving to execute the said particular service logic program corresponding to said service request upon that program being received and stored by said receiving means.

7. A service node according to claim 1, wherein said indication to which the said first control means is responsive is a user-identifying indicator received at said service node and which, without being a service request for said particular service, indicates that said user is in a coverage area of said service node.

8. A service node according to claim 1, including a computer network interface for connection to a computer network that is generally accessible to the users of the telecommunications system but is logically distinct from the latter, the receiving means being operative to receive said service logic programs and content through said computer network interface.

9. A service node according to claim 8, wherein said telecommunications system is a public telephone system and said computer network is the Internet.

10. A service node according to claim 8, wherein said telecommunications system is a private telephone system including a PABX, and wherein said computer network is an intranet.

11. A service node according to claim 8, wherein said receiving means and execution means provide a WWW browser environment enabling service logic programs and content held on remote HTTP servers to be fetched over said computer network according to URIs derived from at least a first of:

said indications;

said service requests;

executing said service logic programs.

12. A method of providing services in a telecommunications system that includes a bearer network, and a node providing a service execution environment for running service logic programs in response to corresponding service requests received thereat, said node having means for receiving remotely-held service logic programs; said method comprising the steps of:

(a) determining from indications within said telecommunications system that particular said remotely-held service logic programs may soon be required for execution by said node, (b) in response to step (a) determining that a said particular remotely-held service logic program may soon be required for execution by said node, transferring that service logic program to said node for temporary storage thereat, (c) thereafter executing at said node the particular service logic program transferred in step (b), in the event that a service request invoking that program is received by that node;

the service logic program transferred in step (b) having associated content intended for delivery to a user of the telecommunications system over said bearer network, this content being held remotely with the associated service logic program but separately therefrom and being retrieved to said node at the instigation of the associated service logic program and delivered by said node to the bearer network upon execution of the service logic program in step (c).

13. A method according to claim 12, wherein step (a) determines that a particular service logic program may soon be required when a potential user of that service is detected as being within a coverage zone of the telecommunications system.

14. A method according to claim 12, including the further step of:

(d) retrieving at an instigation of the service logic program executing in step (c), a remotely-held follow-up service logic program associated with the executing program, said follow-up program being temporarily stored at said node and subsequently executed by the node in providing the requested service.

15. A method according to claim 12, wherein said telecommunications system is a public telephone system and said remotely-held service logic programs are held on servers located on a computer network to which said node has access.

16. A method according to claim 15 wherein said computer network is the Internet.

17. A method of providing services in a telecommunications system that includes a bearer network, and a node providing a service execution environment for running service logic programs in response to corresponding service requests received thereat, said node having means for receiving remotely-held service logic programs; said method comprising the steps of:

(a) receiving a service request at said node, (b) initially responding to the service request received in step (a) by executing a standard service logic program held at that node, execution of said standard service logic program comprising a delivery of standard content, also held at said node, through said bearer network to a user of said telecommunications system identified in the service request, (c) simultaneously with at least step (b), retrieving to said node a service logic program specific to said service request from a location remote from said node, (d) executing the service logic program retrieved in step (c) at said node in coordination with a combination of the initial response provided by said standard service logic program in step (b) to said service request.

18. A method according to claim 17, wherein the service logic program retrieved in step (c) includes content intended for delivery to a user of the telecommunications system over said bearer network, step (d) involving delivery of the content by said node over said bearer network.

19. A method according to claim 17, wherein the service logic program retrieved in step (c) has associated content intended for delivery to a user of the telecommunications system over said bearer network, this content being held remotely with but separately from the associated service logic program but separately therefrom and being retrieved to said node at an instigation of the associated service logic program and delivered by said node to the bearer network under control of said associated service logic program in step (d).

20. A method according to claim 19, wherein the service logic program retrieved in step (c) causes its associated content to be fetched only when required for delivery over the bearer network.

21. A method according to claim 19, wherein the service logic program retrieved in step (c) causes its associated content to be fetched in anticipation of delivery of that content over the bearer network.

22. A method according to claim 17, including the further step of:

(e) retrieving at an instigation of the service logic program executing in step (d), a remotely-held follow-up service logic program associated with the executing program, said follow-up program being temporarily stored at said node and subsequently executed by the node in providing the requested service.

23. A method according to claim 17, wherein said remotely-held service logic program retrieved to said node in step (c) is retrieved by the node in response to receipt thereat of said service request.

24. A method according to claim 17, wherein said service request is passed to said node by a service control point of the telecommunication system, the retrieval of said remotely-held service logic program in step (c) being instigated by said service control point.

25. A method according to claim 24, wherein said remotely-held service logic program is initially retrieved to said service control point and is then passed from there to said node.

26. A method according to claim 17, wherein said telecommunications system is a public telephone system and said remotely-held service logic programs are held on servers located on a computer network to which said node has access.

27. A method according to claim 26 wherein said computer network is the Internet.

28. A method of providing services in a telecommunications system that includes a bearer network and a node providing a service execution environment for running service logic programs in response to corresponding service requests received thereat; said method comprising the steps of:

(a) determining that a particular remotely-held service logic program may soon be required for execution by said node, this determination being effected as a consequence of a potential user of a service provided by said particular service logic program being detected, otherwise than through a request for said service, as being within a coverage zone of the telecommunications system, (b) in response to said determination being made, transferring the said particular service logic program to said node for temporary storage thereat, (c) thereafter executing at said node the said particular service logic program transferred in step (b), in the event that a service request invoking that program is received by that node.

29. A method according to claim 28, wherein the said particular service logic program transferred in step (b) includes content intended for delivery to a user of the telecommunications system over said bearer network, execution of said service logic program in step (c) involving delivery of the content by said node over said bearer network.

30. A method according to claim 28, wherein the said particular service logic program transferred in step (b) has associated content intended for delivery to a user of the telecommunications system over said bearer network, this content being held remotely with but separately from the associated service logic program but separately therefrom and being retrieved to said node at an instigation of the associated service logic program and delivered by said node to the bearer network upon execution of the service logic program in step (c).

31. A method according to claim 28, including the further step of:

(d) retrieving at an instigation of the service logic program executing in step (c), a remotely-held follow-up service logic program associated with an executing program, said follow-up program being temporarily stored at said node and subsequently executed by the node in providing the requested service.

32. A service node for providing services in a telecommunications system that includes a bearer network for transmitting content between users, said service node comprising:

receiving means for receiving and temporarily storing service logic programs and associated content that are normally held remote from the service node;

first control means responsive to an indication that a particular service associated with a particular user at least may soon be requested, to cause said receiving means to receive and store a particular service logic program corresponding to said particular service;

execution means for executing the service logic programs;

second control means responsive to a service request for said particular service, to cause the corresponding said particular logic program, received and stored by said receiving means, to be executed by said execution means;

bearer-network transmit means operable under control of said particular service logic program executing on said execution means, to deliver to said bearer network said content received by said receiving means which is associated with said particular service logic program; and a computer network interface for connection to a computer network that is generally accessible to the users of the telecommunications system but is logically distinct from the latter, the receiving means being operative to receive said service logic programs and content through said computer network interface, said receiving means and execution means providing a WWW browser environment enabling service logic programs and content held on remote HTTP servers to be fetched over said computer network according to URIs derived from at least a first of:

said indications;

said service requests;

executing said service logic programs.

* * * * *